(12) United States Patent
Shigeta

(10) Patent No.: US 7,760,406 B2
(45) Date of Patent: Jul. 20, 2010

(54) COLOR CONVERSION DEFINITION CREATING APPARATUS, COLOR CONVERSION DEFINITION PROGRAM STORAGE MEDIUM AND COLOR CONVERSION DEFINITION CREATING METHOD

(75) Inventor: Norimasa Shigeta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 977 days.

(21) Appl. No.: 11/403,875

(22) Filed: Apr. 14, 2006

(65) Prior Publication Data

US 2006/0238615 A1 Oct. 26, 2006

(30) Foreign Application Priority Data

Apr. 21, 2005 (JP) ............................. 2005-123813

(51) Int. Cl.
*G03F 3/08* (2006.01)
*G06F 15/00* (2006.01)
*G06K 9/00* (2006.01)

(52) U.S. Cl. ..................... 358/518; 358/1.9; 382/162
(58) Field of Classification Search ................ None
See application file for complete search history.

(56) References Cited

U.S. PATENT DOCUMENTS 7,277,200 B2 * 10/2007 Ohga ......................... 358/1.9

2001/0038468 A1 * 11/2001 Hiramatsu ................... 358/518
2002/0031256 A1 * 3/2002 Hiramatsu et al. ........... 382/162
2003/0133138 A1 * 7/2003 Namikata ..................... 358/1.9

FOREIGN PATENT DOCUMENTS

| JP | 2001-103329 A | 4/2001 |
| JP | 2002-16816 A | 1/2002 |
| JP | 2003-18416 A | 1/2003 |
| JP | 2003-298865 A | 10/2003 |
| JP | 2004-200938 A | 7/2004 |

\* cited by examiner

*Primary Examiner*—Twyler L Haskins
*Assistant Examiner*—Barbara D Reinier
(74) *Attorney, Agent, or Firm*—Sughrue Mion, PLLC

(57) ABSTRACT

The apparatus is provided with an area conversion section that creates two or more conversion areas by executing more than one type of adaptive conversion of approximating a gray area in a first color expression area to a gray area in a second color expression area while causing other areas to move following the gray area, and an intermediate area creating section that creates an intermediate area by combining a first conversion area which is closest to the chroma range of the first color expression area and a second conversion area closest to the brightness range of the second color expression area out of the plurality of conversion areas created by the area conversion section.

11 Claims, 13 Drawing Sheets

COLOR CONVERSION DEFINITION CREATING APPARATUS, COLOR CONVERSION APPARATUS, COLOR CONVERSION DEFINITION PROGRAM STORAGE MEDIUM AND COLOR CONVERSION DEFINITION CREATING METHOD

BACKGROUND OF THE INVENTION

1. Field of the Invention

The present invention relates to a color conversion definition creating apparatus that creates a color conversion definition which defines a color conversion relationship between a first color expression area which expresses a range of colors that can be expressed by a first device which mediates between an image and image data and a second color expression area which expresses a range of colors that can be expressed by a second device which mediates between an image and image data, a color conversion definition creating program storage medium that stores a color conversion definition creating program for causing a computer to operate as the color conversion definition creating apparatus, and a color conversion definition creating method to create a color conversion definition.

2. Description of the Related Art

Various types of input device which obtains image data by inputting an image, for example, a color scanner which reads a recorded image and obtains image data and DSC (digital still camera) which obtains image data by forming an image of an object on a solid image-pickup device and reads the image are known. In these input devices, image data is expressed by data in a predetermined range of, for example, 0 to 255 for each of 3 colors of R (red), G (green), B (blue), but there are naturally limitations on colors that can be expressed with numerical values within the respective predetermined ranges of 3 colors of R, G and B and even if colors of an original image have an extremely abundant expressions, when the colors are converted to image data using an input device, the colors of the image expressed by the image data are limited to colors within certain color expression areas within color spaces of R, G, B.

On the other hand, various types of output device which outputs an image based on image data such as a photograph printer which records an image onto photographic paper by exposing the surface of the photographic paper to laser light and developing the photographic paper, a printer which records an image on a sheet using a system such as an electrophotographic system or an ink jet system, a printing machine which turns a rotary press and creates many prints, an image display device such as a CRT display or a plasma display which displays an image on a display screen based on image data are known, but even for these output devices, there are also color expression areas corresponding to each output device as in the case of the input devices. That is, an output device can express various colors based on image data which expresses 3 colors of R, G, B and image data which expresses 4 colors of C (cyan), M (magenta), Y (yellow), K (black), but the colors which can be expressed are limited to certain color expression areas (for example, color expression area which is expressed by numerical values within a range of 0 to 255 for each of R, G, B) in the output device color space (for example, RGB color space, CMYK color space). A color expression area in such an input device and output device is called "color gamut."

On the other hand, in recent years, there are an increasing number of cases where image data is diverted between various input devices and output devices and a method of keeping colors of an image equal when diverting image data is also known. For example, a typical method of defining a correlation between coordinates of a device color space which is dependent on the device and coordinates of an independent color space (Device Independent Data space: e.g., L*a*b* color space) which is not dependent on the device by a correspondence table called a "profile", preparing the table for each type of input device and output device, creating a combined profile which combines profiles of the respective devices for which the image data is diverted and therebyconverting the image data is known.

However, as described above, the color expression area varies from one device to another, and if image data is diverted using the method of keeping image colors equal, some color expressions may be lost in parts where color expression areas do not match. When such a loss is large, the image expressed by the inverted image data becomes an unnatural image.

On the other hand, it is an experimentally known fact that regardless of different color expression areas, an originally identical image can be expressed as images natural to human eyes by various devices respectively. The natural images expressed by these various kinds of devices are expressed in slightly different colors in accordance with the difference among color expression areas of the devices, but since the level of adaptability of human eyes is high, images expressed by any devices give natural impression.

Therefore, there is a demand for a color conversion which coverts colors of an image that can keep an impression of the image natural when inverting image data. Such a color conversion is preferably such that each color in a color expression area (color gamut) of a certain device can be associated with each color in the color expression area (color gamut) of another device in just proportion and this color conversion is called "gamut mapping."

As described above, the color expression area varies from one device to another and even if image data are numerically the same, their colors expressed by different devices differ from one another. Thus, when converting image data obtained using an input device to image data which is suitable for image output using an output device, a conversion of the image data using a series of procedures as shown below is adopted. First, the image data obtained using the input device is converted to image data in a mapping area on the input side in which the color expression area of the input device is mapped onto a common color space such as an L*a*b* color space. Next, through a gamut mapping between the mapping area on this input side and the mapping area on the output side in which the color expression area of the output device is mapped onto the common color space, the image data on the mapping area on the input side is converted to the image data in the mapping area on the output side. The image data in the mapping area on the output side is converted to image data in the color space which is dependent on the output device.

A color conversion relationship between the color expression area of the input device in which a gamut mapping in such a common color space is incorporated and the color expression area of the output device is defined beforehand in the form of, for example, LUT (lookup table). Then, when a document image is read by the input device, the document image is reproduced and output by the output device, the image data obtained by the input device is subjected to a color conversion using the LUT and an image based on the image data after the color conversion is output by the output device. Here, the LUT incorporating a gamut mapping or the like which defines the color conversion relationship between the color expression area of the input device and the color expression area of the output device is called a "color conversion definition."

The gamut mapping incorporated in the color conversion relationship defined by such a color conversion definition is roughly divided into: a stage of adaptive conversion in which the color expression area of the input device is converted to an intermediate area which is similar to the color expression area of the output device to a certain degree, by typically approximating a gray area in the color expression area of the input device to the gray area in the color expression area of the output device; and a stage of mapping processing which assigns each color in the intermediate area obtained through this adaptive conversion to the color expression area of the output device based on a predetermined rule. Here, an appreciator's impression about colors of the image finally output from the output device largely depends on the shape of the intermediate area. Furthermore, the shape of the intermediate area is determined in many cases by what adaptive conversion the intermediate area is created, and therefore various gamut mappings with adaptations added to this adaptive conversion are conventionally proposed.

For example, there is a proposal of a gamut mapping which performs a so-called "Vonkries" conversion at the time of an adaptive conversion (for example, see Japanese Patent Laid-Open No. 2001-103329). According to an adaptive conversion which performs this Vonkries conversion, a gray area in the color expression area of the input device approximates to a gray area in the color expression area of the output device by approximating white points in the color expression area of the input device to white points in the color expression area of the output device. Furthermore, when the gray area in the color expression area of the input device approximates to the gray area in the color expression area of the output device through this adaptive conversion, the areas other than the gray area also move according to the movement of the gray area. In addition to the processing about white points in the color expression area of the input device, this Japanese Patent Laid-Open No. 2001-103329 also describes a gamut mapping which performs processing of approximating black points in this color expression area to black points in the color expression area of the output device and improving the degree of approximation of the gray area during an adaptive conversion.

Furthermore, for example, Japanese Patent Laid-Open No. 2002-16816 and Japanese Patent Laid-Open No. 2004-200938 propose a gamut mapping which performs an adaptive conversion which approximates the gray area in the color expression area of the input device to the gray area in the color expression area of the output device by matching brightness of each of the white points and black points in the color expression area of the input device to brightness of each of the white points and black points in the color expression area of the output device while maintaining chroma of each color in the color expression area of the input device.

Furthermore, there is also a proposal of a gamut mapping (for example, see Japanese Patent Laid-Open No. 2003-18416 and Japanese Patent Laid-Open No. 2003-298865) which determines the degree of the adaptation which indicates to what degree the gray area in the color expression area of the input device is approximated to the gray area in the color expression area of the output device according to a predetermined rule, for example, during an adaptive conversion and performs an adaptive conversion which approximates the gray area in the color expression area of the input device to the gray area in the color expression area of the output device based on the determined degree of adaptation.

When a document which is input to the input device is reproduced by the output device, the image which is output by the output device is preferably such an image that maintains the chroma of the document to a certain degree and restrains collapse of gradation on the highlight side and the shadow side or the like. However, when, for example, an image is output by the output device whose brightness range is narrower than the brightness range of the input device, an adaptive conversion such as compressing the brightness range of the input device is performed by matching each of the white points and black points in the color expression area of the input device to each of the white points and black points in the color expression area of the output device in order to restrain the collapse of gradation or the like on the highlight side and the shadow side. However, in the Vonkries conversion or the like, when the brightness range is compressed, the chroma range is also compressed accordingly and depending on the degree of compression of the brightness range, the image which is output by the output device has greater detail on the shadow side, whereas it may become an unnatural, less colorful image with total chroma reduced.

Furthermore, in the gamut mapping described in Japanese Patent Laid-Open No. 2002-16816 and Japanese Patent Laid-Open No. 2004-200938, the chroma of colors in the color expression area of the input device is maintained during an adaptive conversion in order to restrain such a reduction of chroma. According to such a gamut mapping, even if the brightness range of the input device is compressed during the adaptive conversion, the reduction of the chroma in the image which is output by the output device is restrained compared to the adaptive conversion using the Vonkries conversion. However, when the brightness range of the color expression area of the output device is extremely narrower than the brightness range of the color expression area of the input device, the color expression area of the input device is greatly compressed only in the brightness direction during the adaptive conversion, the intermediate area obtained through the adaptive conversion becomes an area where the chroma of colors is unnaturally emphasized. As a result, the image output by the output device becomes an image with unnaturally emphasized chroma.

As described above, various conventional gamut mappings have their advantages and disadvantages and it is the present situation that no such technique that an image with natural colors is output by an output device with a high degree of accuracy is proposed yet.

SUMMARY OF THE INVENTION

The present invention has been implemented in view of the above circumstances and provides a color conversion definition creating apparatus that can create a color conversion definition capable of acquiring an image of natural colors using an output device even when a brightness range of a color expression area of the output device is extremely narrower than a brightness range of a color expression area of an input device, a color conversion definition creating program storage medium that stores a color conversion definition creating program for causing a computer to operate as such a color conversion definition creating apparatus, and a color conversion definition creating method capable of creating the color conversion definition.

The color conversion definition creating apparatus of the present invention that creates a color conversion definition which defines a color conversion relationship between a first color expression area expressing a range of colors that can be expressed by a first device that mediates between an image and image data and a second color expression area expressing a range of colors that can be expressed by a second device that mediates between an image and image data, comprises: an area conversion section that creates two or more conversion areas by executing an adaptive conversion of approximating a gray area in the first color expression area to a gray area in the second color expression area while causing areas other than the gray area to move following the gray area for each of two or more types of adaptive conversions having different ways of approximation; an intermediate area creating section that creates an intermediate area by combining a first conversion area excluding a conversion area which has a chroma range most different from the chroma range of the first color expression area out of the plurality of conversion areas created by the area conversion section and a second conversion area excluding a conversion area having a brightness range most different from the brightness range of the second color expression area; and a definition creating section that creates the color conversion definition by combining a correlation between colors in the first color expression area and colors in the intermediate area, and a correlation between colors in the intermediate area and colors in the second color expression area.

Here, the aspect of the color conversion definition creating apparatus of the present invention that "the intermediate area creating section creates an intermediate area by combining a first conversion area which has a chroma range closest to the chroma range of the first color expression area and the second conversion area which has a brightness range closest to the brightness range of the second color expression area out of the plurality of conversion areas created by the area conversion section" is a typical aspect.

According to the color conversion definition creating apparatus of the present invention, when creating the intermediate area, the intermediate area creating section combines the first conversion area having a chroma range close to the chroma range of the first color expression area out of the plurality of conversion areas, that is, a preferable conversion area with respect to the chroma range out of the plurality of conversion areas and the second conversion area having a brightness range close to the brightness range of the second color expression area out of the plurality of conversion areas, that is, a preferable conversion area with respect to the brightness range out of the plurality of conversion areas. Even when the brightness range of the second color expression area is extremely narrower than the brightness range of the color expression area of the first device, it is possible to create a color conversion definition capable of reproducing an image of natural colors using the second device.

Furthermore, in the color conversion definition creating apparatus of the present invention, the aspect that "when creating the intermediate area by combining the first conversion area and the second conversion area, the intermediate area creating section determines a color having chroma which is equal to the chroma of a color in the first conversion area and brightness which is equal to the brightness of a color in the second conversion area corresponding to the color in the first conversion area through the plurality of types of adaptive conversions as the color in the intermediate area" is also a preferable aspect.

According to the color conversion definition creating apparatus having this preferred aspect, it is possible to easily create an intermediate area having both the chroma range equal to the chroma range of the first conversion area and the brightness range equal to the brightness range of the second conversion area.

Furthermore, in the color conversion definition creating apparatus of the present invention, the aspect that "when creating the intermediate area by combining the first conversion area and the second conversion area, the intermediate area creating section mixes a color in the first conversion area and a color in the second conversion area corresponding to the color in the first conversion area through the plurality of types of adaptive conversions with heavier weights assigned to colors at greater distances from the gray area and determines the mixed color obtained by the mixture as the color in the intermediate area" is also a preferable aspect.

According to the color conversion definition creating apparatus having this preferred aspect, as the intermediate area, it is possible to obtain an area approximate to the second conversion area in the vicinity of the gray area and approximate to the first conversion area in the vicinity of a high-chroma area. In this way, it is possible to create an intermediate area which is preferable for both the chroma range and brightness range.

Furthermore, in the color conversion definition creating apparatus of the present invention, the aspect that "the area conversion section executes a first adaptive conversion of approximating a white point in the first color expression area to a white point in the second color expression area and a second adaptive conversion of approximating a white point and black point in the first color expression area to a white point and black point respectively in the second color expression area and thereby creates two conversion areas" is also preferable aspect.

According to the color conversion definition creating apparatus having this preferred aspect, a conversion area having a preferable chroma range is created through the first adaptive conversion and a conversion area having a preferable brightness range is created through the second adaptive conversion. By combining these two, an intermediate range having a range preferable for both the chroma range and brightness range is created.

Furthermore, in the color conversion definition creating apparatus of the present invention, the aspect that "using a target white point whose closeness to a white point in the second color expression area is greater than closeness of a white point in the first color expression area to the white point in the second color expression area and a target black point whose closeness to a black point in the second color expression area is greater than closeness of a black point in the first color expression area to the black point in the second color expression area, the area conversion section executes a first adaptive conversion of causing the white point in the first color expression area to match the target white point and a second adaptive conversion of causing the white point and black point in the first color expression area to match the target white point and target black point to thereby create two conversion areas" is also a preferable aspect.

According to the color conversion definition creating apparatus having this preferred aspect, the processing of approximating the white point and black point in the first color expression area to the white point and black point in the second color expression area respectively can be realized through simple processing of causing the white point and black point in the first color expression area to match the target white point and target black point.

Furthermore, this type of color conversion definition creating apparatus using the target white point and target black point can also have an aspect that "the area conversion section uses a target white point and target black point having chroma equal to the chroma of each of the white point and black point in the first color expression area and brightness equal to the brightness of each of the white point and black point in the second color expression area as the target white point and the target black point," or "further comprising a black and white acquisition section that acquires a white point and black point according to an operation, wherein the area conversion section uses the white point and black point acquired by the black and white acquisition section as the target white point and the target black point," or "further comprising a black and white calculating section that receives degrees of similarity of the target white point and the target black point to a white point and black point in the second color expression area according to an operation and calculates a white point and black point according to the degrees of similarity, wherein the area conversion section uses the white point and the black point calculated by the black and white calculating section as the target white point and target black point."

Of these three aspects, the first aspect is that the target white point and target black point are uniquely determined based on the chroma of each of the white point and black point in the first color expression area and the brightness of each of the white point and black point in the second color expression area. Furthermore, both the second and third aspects are that the white point and black point obtained through the operator's operation are used as the target white point and target black point. In the second aspect, the white point and black point are input specifically as coordinates or the like, and in the third aspect, sensory values such as the degree of similarity are input as values relating to the white point and black point through the operator's operation first, and the white point and black point are calculated based on the degree of similarity.

The color conversion definition creating program storage medium is a color conversion definition creating program storage medium incorporated in a computer, which stores a color conversion definition creating program causing the computer to operate as a color conversion definition creating apparatus that creates a color conversion definition which defines a color conversion relationship between a first color expression area expressing a range of colors that can be expressed by a first device that mediates between an image and image data and a second color expression area expressing a range of colors that can be expressed by a second device that mediates between an image and image data, the color conversion definition creating program constructing on the computer: an area conversion section that creates two or more conversion areas by executing an adaptive conversion of approximating a gray area in the first color expression area to a gray area in the second color expression area while causing areas other than the gray area to move following the gray area for each of two or more types of adaptive conversions having different ways of approximation; an intermediate area creating section that creates an intermediate area by combining a first conversion area excluding a conversion area which has a chroma range most different from the chroma range of the first color expression area out of the plurality of conversion areas created by the area conversion section and a second conversion area excluding a conversion area having a brightness range most different from the brightness range of the second color expression area; and a definition creating section that creates the color conversion definition by combining a correlation between colors in the first color expression area and colors in the intermediate area, and a correlation between colors in the intermediate area and colors in the second color expression area.

The storage medium of the present invention may also be a hard disk, memory chip or the like in addition to a storage medium such as an FD (flexible disk), CD-R, CD-RW, MO, and DVD.

Furthermore, the color conversion definition creating method is a color conversion definition creating method for creating a color conversion definition which defines a color conversion relationship between a first color expression area expressing a range of colors that can be expressed by a first device that mediates between an image and image data and a second color expression area expressing a range of colors that can be expressed by a second device that mediates between an image and image data, comprising: an area conversion step of creating two or more conversion areas by executing an adaptive conversion of approximating a gray area in the first color expression area to a gray area in the second color expression area while causing areas other than the gray area to move following the gray area for each of two or more types of adaptive conversions having different ways of approximation; an intermediate area creating step of creating an intermediate area by combining a first conversion area excluding a conversion area which has a chroma range most different from the chroma range of the first color expression area out of the plurality of conversion areas created by the area conversion section and a second conversion area excluding a conversion area having a brightness range most different from the brightness range of the second color expression area; and a definition creating step of creating the color conversion definition by combining a correlation between colors in the first color expression area and colors in the intermediate area, and a correlation between colors in the intermediate area and colors in the second color expression area.

According to the color conversion definition creating method, it is possible to create the preferable color conversion definition.

The aspects of color conversion definition creating program storage medium of the present invention and color conversion definition creating method of the present invention are limited to only basic ones here, but this is only for the purpose of avoiding redundancy and the color conversion definition creating program storage medium and color conversion definition creating method according to the present invention include various aspects corresponding to the aspects of color conversion definition creating apparatus.

As described above, according to the present invention, even when the brightness range of the color expression area of the second device (e.g., output device) is extremely narrower than the brightness range of the color expression area of the first device (e.g., the input device), it is possible to create a color conversion definition capable of obtaining an image of natural colors using the second device.

DETAILED DESCRIPTION OF THE INVENTION

With reference now to the attached drawings, embodiments of the present invention will be explained below.

Figure 1:
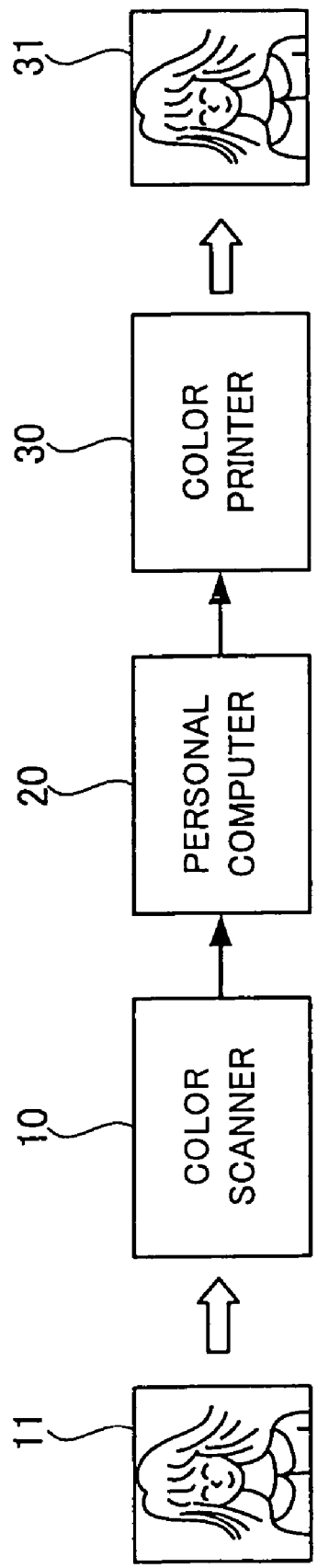
FIG. 1 is an overall configuration diagram of an image input—color conversion—image output system to which an embodiment of the present invention is applied.

FIG. 1 is an overall configuration diagram of an image input—color conversion—image output system to which an embodiment of the present invention is applied.

A color scanner 10 is shown here, and a document image 11 is read by the color scanner 10 and image data of 3 RGB colors is generated. The RGB image data is input to a personal computer 20. This personal computer 20 converts the image data captured by the color scanner 10 to image data of 3 RGB colors for image output suitable for a color printer 30, which will be described later. This image data for image output is input to the color printer 30 and the color printer 30 performs print output based on the input image data and forms a print image 31.

Here, this personal computer 20 also serves as an embodiment of the color conversion definition creating apparatus according to the present invention and this personal computer 20 creates a color conversion definition beforehand and refers to the created color conversion definition when converting the image data captured by the color scanner 10 to image data for the color printer 30. This color conversion definition and the creating method thereof will be described later.

The system shown in this FIG. 1 shows a color scanner which reads a document image and creates image data as an example of the input device which inputs an image and acquires image data, but in addition to a color scanner, a DSC (digital still camera), a system which acquires image data by recording an image onto a reversal film through photography using a reversal film and reading the recorded image using a color scanner or the like or any other system which inputs an image and acquires image data can be used as the input device.

Furthermore, in the system shown in this FIG. 1, the color printer 30 is shown as an example of the output device which outputs an image based on the image data, but this color printer 30 may also be a color printer based on an electrophotographic system, a color printer based on an ink jet system or a printer based on a system whereby photographic paper is exposed to modulated laser light and the photographic paper is developed, and the printing system does not matter here. Furthermore, the output device is not limited to a printer; it may be a press or image display device such as a CRT display device or plasma display device, which displays an image on a display screen.

However, explanations hereafter will assume the system provided with color scanner 10 and color printer 30 as examples of the input device and output device respectively.

A feature of an embodiment of the present invention in the system shown in this FIG. 1 lies in processing contents executed inside the personal computer 20 and this personal computer 20 will be explained below.

Figure 2:
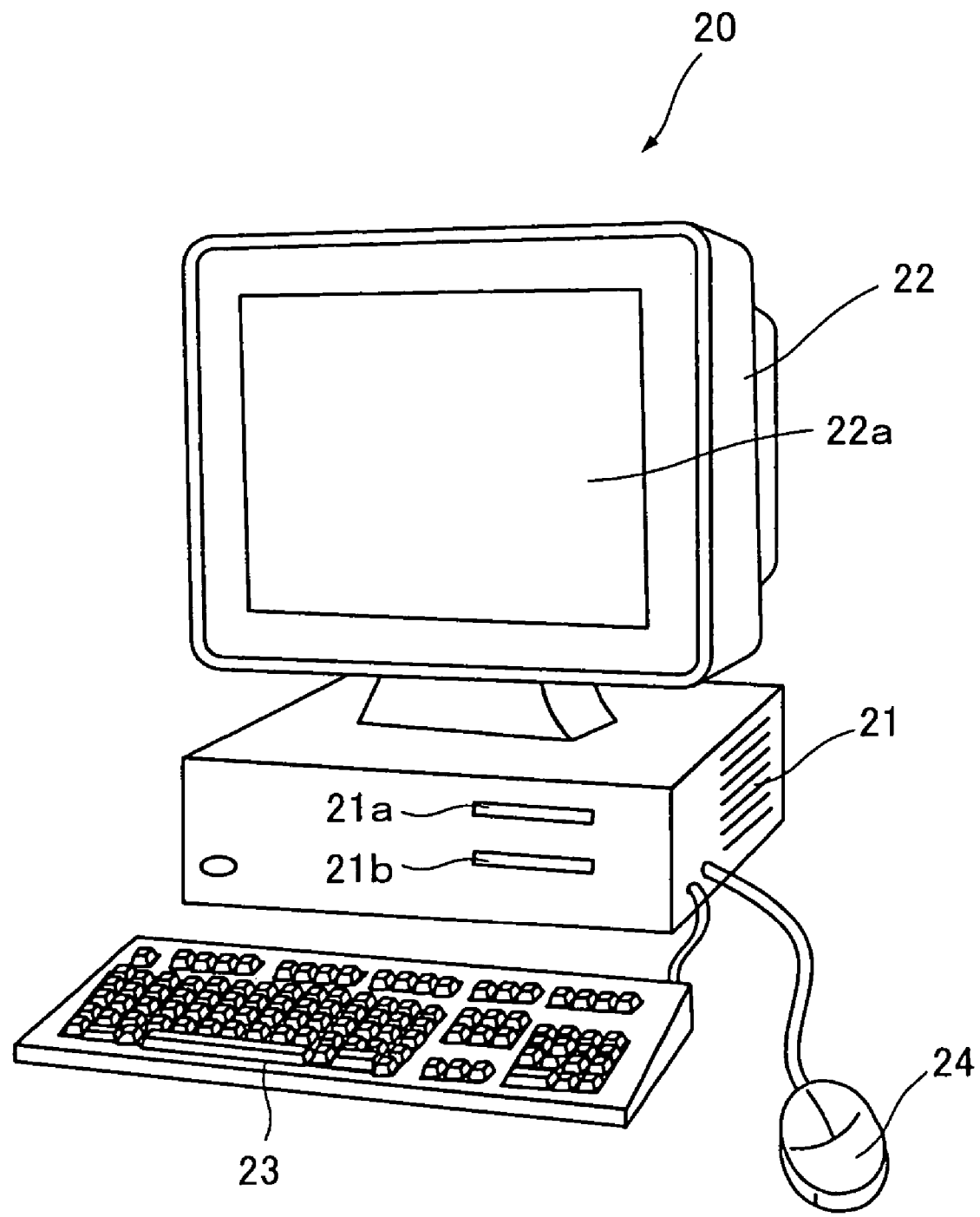
FIG. 2 is an outside perspective view of a personal computer 20 which is shown as one block in FIG. 1.
Figure 3:
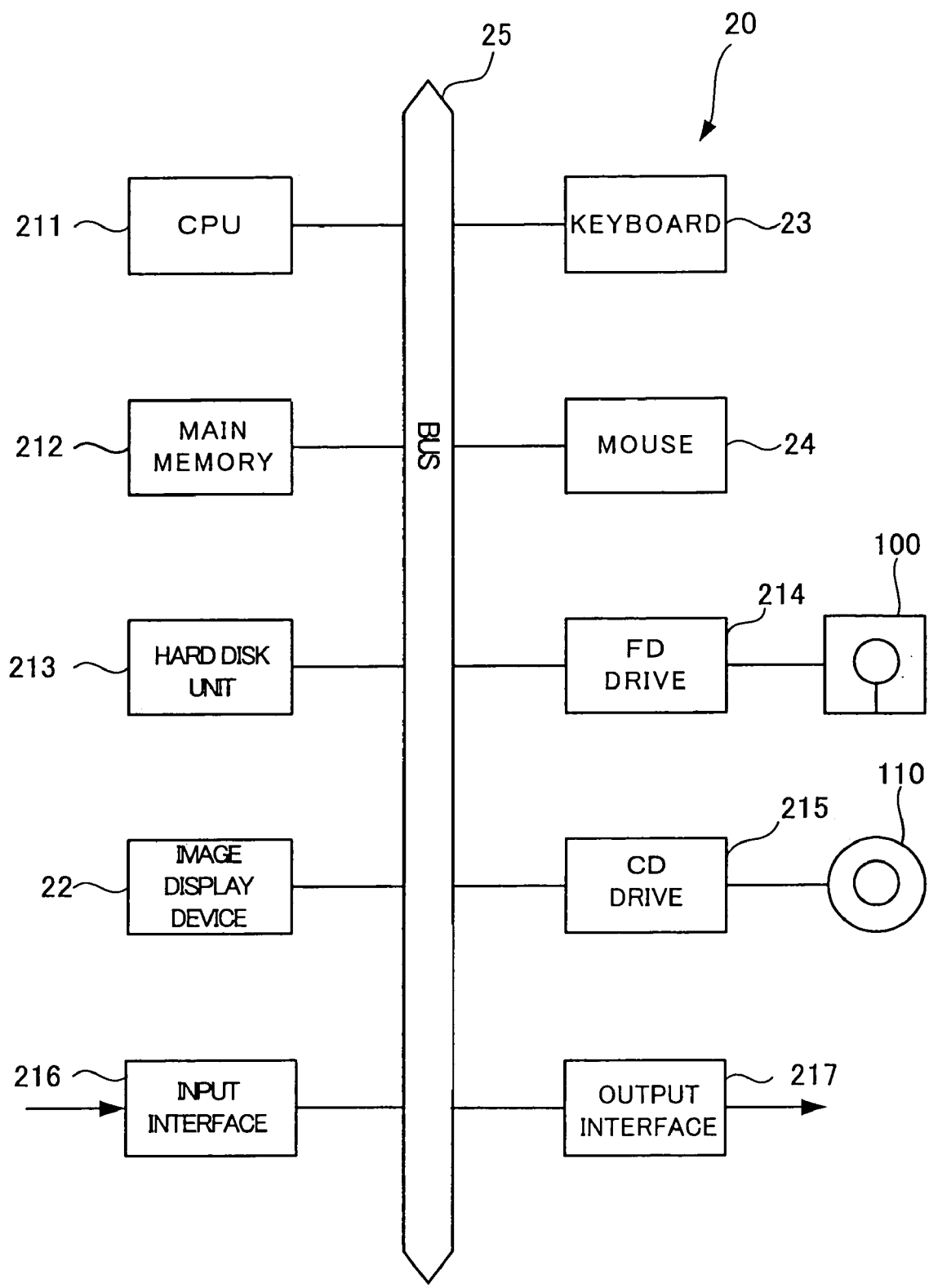
FIG. 3 is a hardware configuration diagram of the personal computer 20.

FIG. 2 is an outside perspective view of the personal computer 20 which is shown as one block in FIG. 1 and FIG. 3 is a hardware configuration diagram of the personal computer 20.

As for the external configuration, this personal computer 20 includes a main unit 21, an image display device 22 which displays an image on a display screen 22a according to an instruction from the main unit 21, a keyboard 23 which inputs various kinds of information according to key operation to the main unit 21 and a mouse 24 which specifies an arbitrary position on the display screen 22a to thereby input an instruction according to an icon or the like displayed at the specified position. In appearance, this main unit 21 includes an FD loading slot 21a to load a flexible disk (FD) and a CD-ROM loading slot 21b to load a CD-ROM.

As shown in FIG. 3, the main unit 21 incorporates a CPU 211 which executes various programs, a main memory 212 from which a program stored in a hard disk unit 213 is read and developed so as to be executed by the CPU 211, the hard disk unit 213 that stores various programs and data or the like, an FD drive 214 which is loaded with an FD 100 and accesses the loaded FD 100, a CD-ROM drive 215 which is loaded with a CD-ROM 110 and accesses the loaded CD-ROM 110, an input interface 216 which is connected to the color scanner 10 (see FIG. 1) and receives image data from the color scanner 10, an output interface 217 which is connected to the color printer 30 (see FIG. 1) and sends image data to the color printer 30, and these components and the image display device 22, keyboard 23 and mouse 24 shown in FIG. 2 are mutually connected through a bus 25.

When the personal computer 20 explained above operates as an embodiment of the color conversion definition creating apparatus of the present invention, an embodiment of the color conversion definition creating method of the present invention is executed inside this personal computer 20. Here, when creating a color conversion definition using the embodiment of the color conversion definition creating method of the present invention, an input profile and an output profile which will be explained below are necessary.

Figure 4:
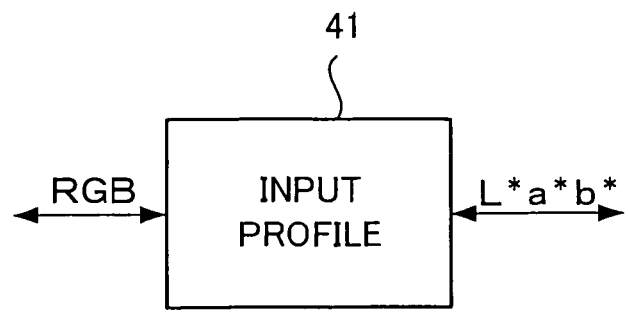
FIG. 4 is a conceptual diagram of an input profile necessary in creating a color conversion definition.

FIG. 4 is a conceptual diagram of an input profile necessary to create a color conversion definition.

When an input profile 41 is available from a manufacturer or the like of the color scanner 10, it is unnecessary to newly create the input profile 41, but a basic method of creating the input profile 41 will be explained here.

First, a color patch image made up of many color patches is prepared instead of the document image 11 shown in FIG. 1, the color patch image is read by the color scanner 10 and color data in an RGB color space is obtained for each color patch. Furthermore, colors of the color patch image are measured using a colorimeter and color data which indicates coordinate points in an L*a*b* color space which is an example of a common color space which is independent of the device such as the color scanner 10 is obtained for each color patch. Hereinafter, explanations will be continued assuming that this common color space is the L*a*b* color space.

By associating the color data obtained using two methods about each color patch with each other, an input profile 41 is obtained in which the correspondence between coordinate points in the RGB color space and coordinate points in the L*a*b* color space is defined. This input profile 41 is a profile which is dependent on the type of the input device, which generally differs depending on the type of the color scanner 10 and more generally the type of the input device.

Figure 5:
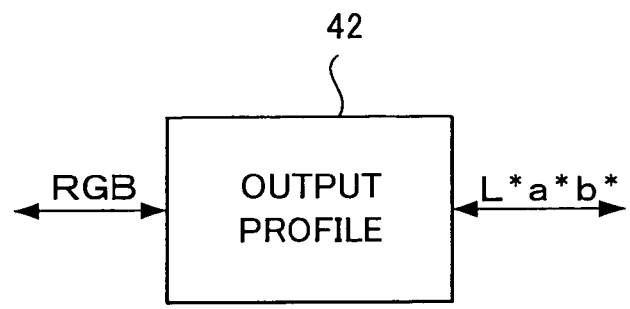
FIG. 5 is a conceptual diagram of an output profile necessary in creating a color conversion definition.

FIG. 5 is a conceptual diagram of an output profile necessary to create a color conversion definition.

An output profile 42 which corresponds to the color printer may be provided from the manufacturer of the color printer, and therefore if the output profile 42 which corresponds to the color printer whereby a print output is to be acquired is available, it is not necessary to create the output profile 42, but here, a basic method of newly creating the output profile 42 will be explained.

Color data whose R, G, B values are sequentially changed is generated as color data of 3 RGB colors from the personal computer 20 shown in FIG. 1 and a color patch image based on the color data generated in this way is printed out. Though the print image 31 shown in FIG. 1 is not the image which expresses a color patch image, colors of each color patch which composes the color patch image is measured using a calorimeter as a color patch image printed out instead of this print image 31 and color data which shows coordinate points in the L*a*b* color space is obtained. By associating the color data of 3 RGB colors generated by the personal computer 20 for each color patch with the color data obtained using the calorimeter, the output profile 42 which defines the correspondence between the coordinate points in the RGB color space and the coordinate points in the L*a*b* color space is obtained. This output profile 42 is the profile which is dependent on the output device, which differs depending on the output device.

Furthermore, when creating a color conversion definition using the embodiment of the color conversion definition creating method of the present invention, a color conversion definition is created by combining the input profile 41 which is dependent on the input device and output profile 42 which is dependent on the output device in the device-independent L*a*b* color space.

Figure 6:
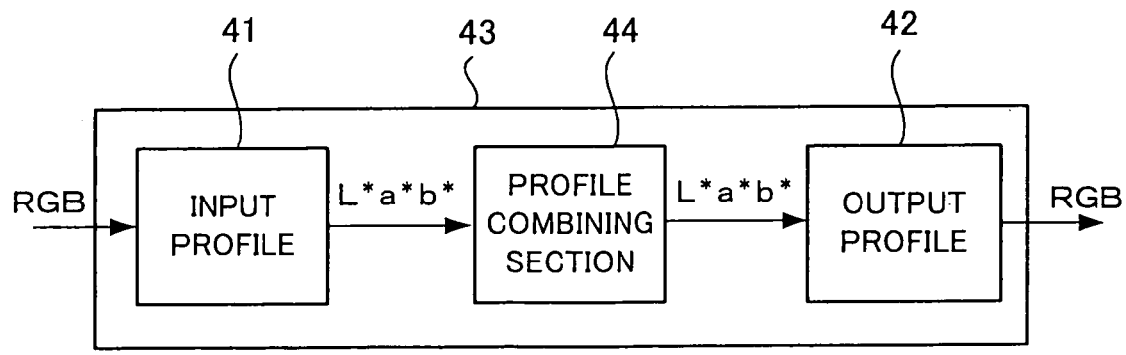
FIG. 6 is a conceptual diagram of a color conversion definition made up of the input profile and output profile combined together in an L*a*b* color space.

FIG. 6 is a conceptual diagram of the color conversion definition made up of an input profile and an output profile combined in the L*a*b* color space.

The color expression area of the color scanner 10 mapped onto the L*a*b* color space obtained from the input profile 41 generally does not match the color expression area of the color printer 30 mapped onto this L*a*b* color space obtained from the output profile 42. For this reason, the color conversion definition 43 shown here conceptually has a mode as shown in FIG. 6 in which the input profile 41 and output profile 42 include a profile combining section 44 which naturally combines the two in the L*a*b* color space.

Hereinafter, an overview of the profile combination by this profile combining section 44 will be explained.

Figure 7:
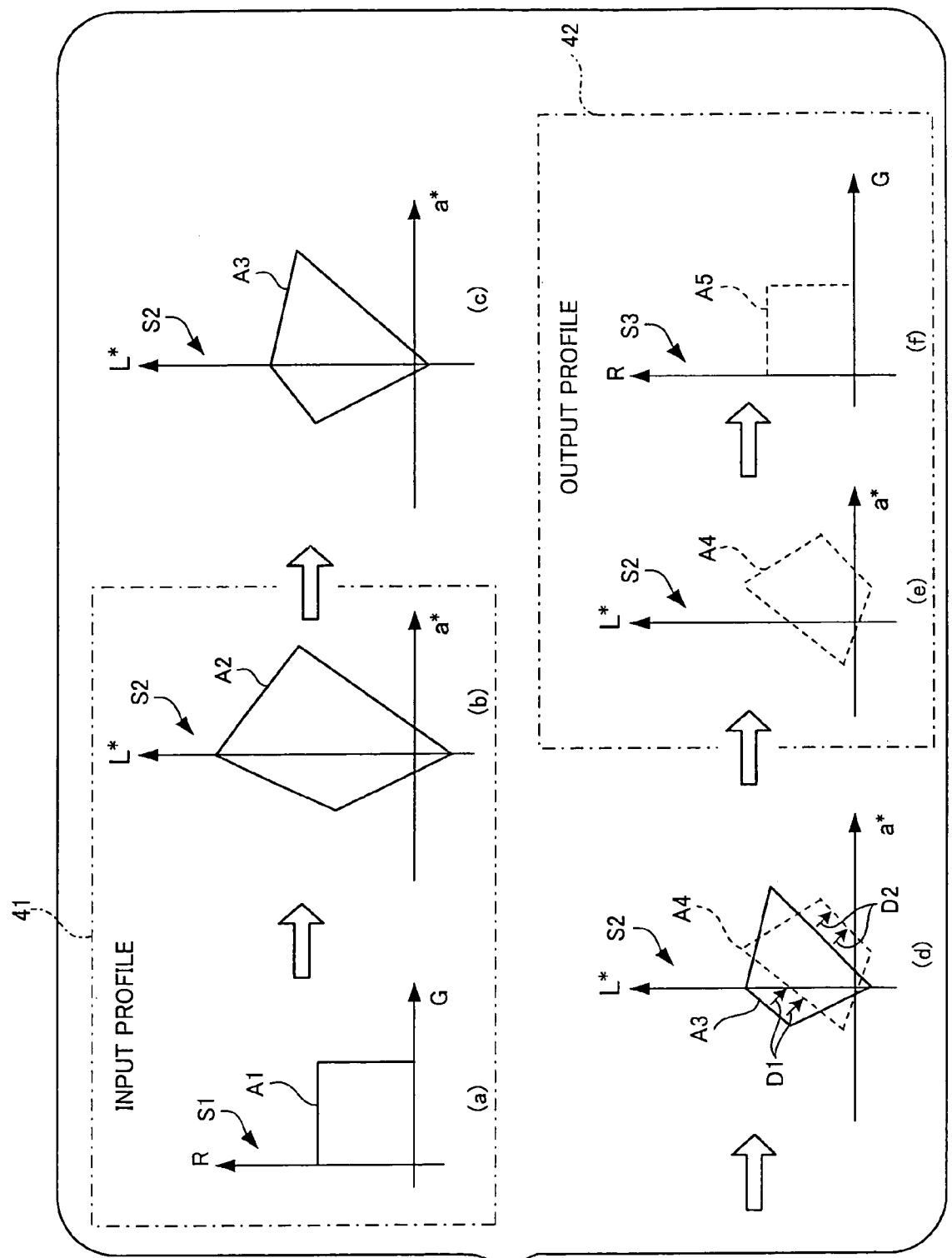
FIG. 7 is a conceptual diagram which shows an overview of the combination of the input profile and the output profile.

FIG. 7 is a conceptual diagram showing an overview of the combination between the input profile and the output profile.

This FIG. 7 shows the RGB color space S1 on the input side, RGB color space S3 on the output side and device-independent L*a*b* color space S2, but for simplicity of illustration, an R-G plane is shown for the two RGB color spaces S1, S3 and L*–a* plane is shown for the L*a*b* color space S2.

The input profile 41 defines a color conversion relationship between the color expression area A1 shown in part (a) of FIG. 7 of the color scanner 10 in RGB color space S1 on the input side and the mapping area A2 shown in part (b) of FIG. 7 which is the color expression area A1 mapped onto the L*a*b* color space S2. On the other hand, the output profile 42 defines a color conversion relationship between the color expression area A5 shown in part (f) of FIG. 7 of the color printer 30 in the RGB color space S3 on the output side and the mapping area A4 shown in part (e) of FIG. 7 which is the color expression area A5 mapped onto the L*a*b* color space S2. Here, the mapping area A2 on the input side does not generally match the mapping area A4 on the output side as is evident from a comparison between part (b) of FIG. 7 and part (e) of FIG. 7. As shown in this FIG. 7, explanations will be continued assuming that the mapping area A4 on the output side, that is, the color expression area of the color printer 30 expressed by the L*a*b* color space S2 is narrower than the color expression area of the color scanner 10 expressed by the mapping area A2 on the input side, that is, L*a*b* color space S2.

Here, when combining the two profiles 41, 42 in the L*a*b* color space S2, the two mapping areas A2, A4 which do not match each other can be naturally associated with each other conceptually by way of an intermediate area A3 shown in part (c) of FIG. 7 having an intermediate shape of these two mapping areas.

Mapping of the two profiles 41, 42 by way of this intermediate area A3 is conceptually performed at the profile combining section 44 shown in FIG. 6 in two stages; mapping between the mapping area A2 on the input side and intermediate area A3, and mapping between the intermediate area A3 and mapping area A4 on the output side. The first-stage mapping mainly corresponds to matching the size of the mapping area A2 on the input side to the size of the mapping area A4 on the output side, that is, mapping related to the size of the area, while the second-stage mapping mainly corresponds to matching the shape of the mapping area A2 on the input side to the shape of the mapping area A4 on the output side, that is, mapping related to shape of the area.

A color conversion using the color conversion definition including such a profile combining section 44 is applied to the image data which expresses the document image 11 read by the color scanner 10 shown in FIG. 1 and the print image 31 is output from the color printer 30 based on the converted image data. The apparent impression of the print image 31 which is output through such processing is significantly influenced by the shape of the intermediate area A3. Details of this intermediate area A3 will be described later using different drawings.

Next, an overview of the mapping between the intermediate area A3 and the mapping area A4 of the output side, which is carried out through the second-stage mapping conceptually included in the profile combining section 44 shown in FIG. 6, will be explained with reference to part (d) of FIG. 7. Hereinafter, the mapping between the intermediate area A3 and mapping area A4 on the output side will be hereinafter referred to as "mapping processing."

In this mapping processing, a compression is performed on each color in the area, which sticks out of the mapping area A4 on the output side, out of the intermediate area A3 such that each color is assigned to the inside of the mapping area A4 on the output side as representatively expressed by arrows D1 in part (d) of FIG. 7. On the other hand, an extension is performed on some colors in the intermediate area A3 such that those colors are assigned to the area, which sticks out of the intermediate area A3, out of the mapping area A4 on the output side as representatively expressed by arrows D2 in part (d) of FIG. 7. Through such a compression and extension, each color in the intermediate area A3 is thoroughly assigned to the mapping area A4 on the output side. This mapping processing is not the subject of the present invention, and therefore explanations thereof are limited to an overview and detailed explanations thereof will be omitted.

The color expression area A1 on the input side shown in part (a) of FIG. 7 and the color expression area A5 on the output side shown in part (f) of FIG. 7 are associated with each other through the combination of the profiles explained above.

This completes explanations of an overview of the creation of a color conversion definition, and next, first embodiments of the color conversion definition creating method of the present invention, color conversion definition creating program storage medium of the present invention and color conversion definition creating apparatus of the present invention will be explained.

Figure 8:
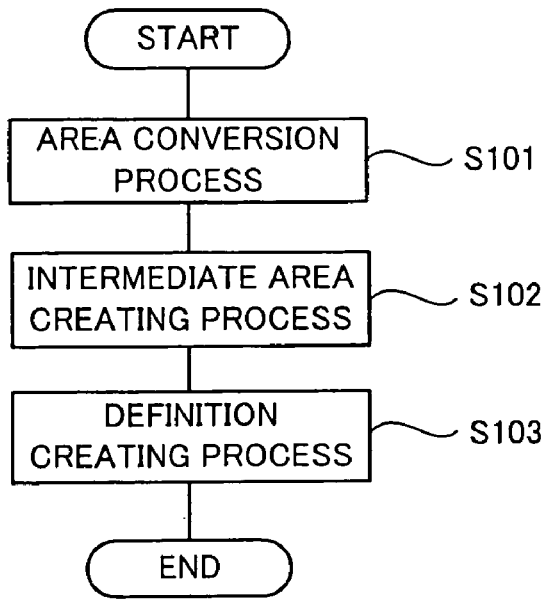
FIG. 8 is a flow chart showing a first embodiment of the color conversion definition creating method of the present invention.

FIG. 8 is a flow chart showing the first embodiment of the color conversion definition creating method of the present invention.

The color conversion definition creating method shown in this flow chart is a color conversion definition creating method whose overview has been explained above and includes an area conversion process (step S101), an intermediate area creating process (step S102) and a definition creating process (step S103). Here, the area conversion process (step S101), intermediate area creating process (step S102) and definition creating process (step S103) correspond to examples of the area conversion step, intermediate area creating step and definition creating step of the color conversion definition creating method of the present invention respectively. Details of each of these processes will be explained together with operation of each section of the first embodiment of the color conversion definition creating apparatus of the present invention.

Next, a first embodiment of the color conversion definition creating program storage medium of the present invention will be explained.

Figure 9:
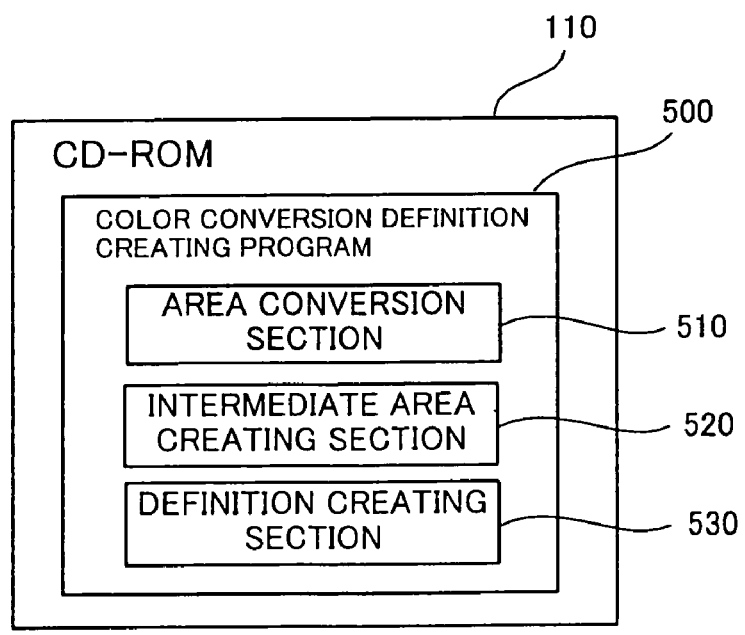
FIG. 9 is a conceptual diagram showing a first embodiment of the color conversion definition creating program storage medium of the present invention.

FIG. 9 is a conceptual diagram showing the first embodiment of the color conversion definition creating program storage medium of the present invention.

The CD-ROM 110 shown in FIG. 9 stores a color conversion definition creating program 500 and corresponds to the first embodiment of the color conversion definition creating program of the present invention.

This color conversion definition creating program 500 causes the personal computer 20 shown in FIG. 1 to FIG. 3 to operate as the first embodiment of the color conversion definition creating apparatus of the present invention and is provided with an area conversion section 510, an intermediate area creating section 520 and a definition creating section 530. Details of each of these sections will be explained together with the operation of each section of the first embodiment of the color conversion definition creating apparatus of the present invention.

Next, the first embodiment of the color conversion definition creating apparatus of the present invention will be explained.

Figure 10:
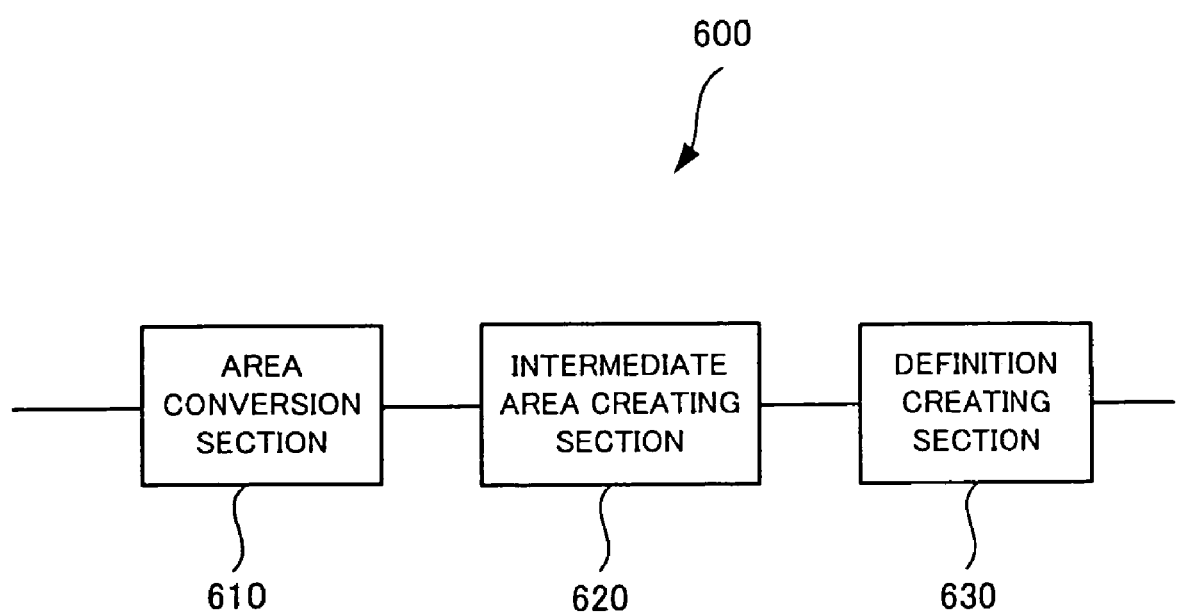
FIG. 10 is a functional block diagram showing the functions when a color conversion definition creating program shown in FIG. 9 is installed in the personal computer shown in FIG. 1 to FIG. 3 and this personal computer operates as a first embodiment of the color conversion definition creating apparatus according to the present invention.

FIG. 10 is a functional block diagram showing the functions of the personal computer shown in FIG. 1 to FIG. 3 in which the color conversion definition creating program shown in FIG. 9 is installed when this personal computer operates as the first embodiment of the color conversion definition creating apparatus according to the present invention.

The color conversion definition creating apparatus 600 shown in FIG. 10 creates the color conversion definition, the overview of which has been explained above, and is provided with an area conversion section 610, an intermediate area creating section 620 and a definition creating section 630. Here, the area conversion section 610, intermediate area creating section 620 and definition creating section 630 correspond to examples of the area conversion section, intermediate area creating section and definition creating section of the color conversion definition creating apparatus of the present invention respectively.

When the color conversion definition creating program 500 shown in FIG. 9 is installed in the personal computer 20 shown in FIG. 1 to FIG. 3, the area conversion section 610 of the color conversion definition creating apparatus 600 is built by the area conversion section 510 of the color conversion definition creating program 500, and in the same way, the intermediate area creating section 620 is built by the intermediate area creating section 520 and the definition creating section 630 is built by the definition creating section 530. Furthermore, the area conversion section 610 of the color conversion definition creating apparatus 600 executes the area conversion process (step S101) in the color conversion definition creating method shown in the flow chart of FIG. 8, and in the same way, the intermediate area creating section 620 executes the intermediate area creating process (step S102) and the definition creating section 630 executes the definition creating process (step S103).

Hereinafter, each section of the color conversion definition creating apparatus 600 will be explained. As in the case of the example in FIG. 7, the explanation here assumes that the color expression area of the color printer 30 expressed by the mapping area A4 on the output side, that is, $L^*a^*b^*$ color space S2 is narrower than the color expression area of the color scanner 10 expressed by the mapping area A2 on the input side, that is, $L^*a^*b^*$ color space S2 and will focus on the processing whereby the mapping area A2 on the input side is compressed and the intermediate area A3 is created. In the following explanations, the components in FIG. 1 will be referred to without particularly indicating their reference numerals.

Figure 11:
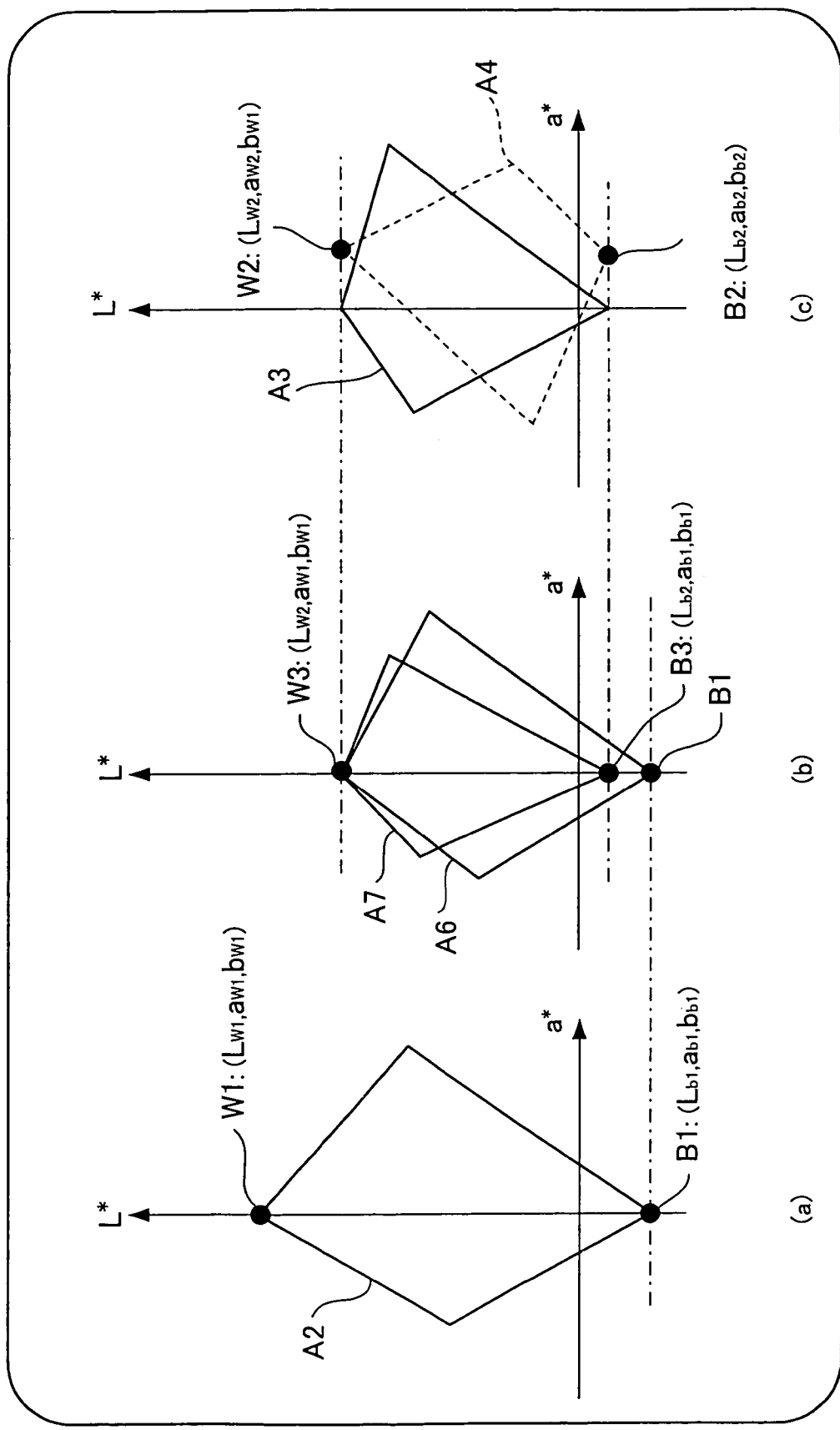
FIG. 11 is a conceptual diagram showing how an adaptive conversion and intermediate area creating processing are executed by the color conversion definition creating apparatus shown in FIG. 10.

Here, FIG. 11 is a conceptual diagram showing the state of an adaptive conversion and intermediate area creating processing executed by the color conversion definition creating apparatus 600 shown in FIG. 10 and this FIG. 11 will be referred to in the following explanations of each section of the color conversion definition creating apparatus 600 in FIG. 10 as appropriate.

The area conversion section 610 acquires the mapping area A2 on the input side shown in part (a) of FIG. 11 which is the color expression area of the color scanner 10 mapped onto the $L^*a^*b^*$ color space from the input profile 41 which is dependent on the color scanner 10 (see FIG. 4 and FIG. 7). In the same way, the area conversion section 610 acquires the mapping area A4 on the output side shown in part (c) of FIG. 11 which is the color expression area of the color printer 30 mapped onto the L*a*b* color space from the output profile 42 which is dependent on the color printer 30 (see FIG. 5 and FIG. 7). In this FIG. 11, the L*–a* plane is shown about the L*a*b* color space for simplicity of illustration.

As shown in next part (b) of FIG. 11, this area conversion section 610 has a chroma equal to the chroma (aw1, bw1), (ab1, bb1) of each of the white point W1 and black point B1 in the mapping area A2 on the input side and sets a target white point W3 (Lw2, aw1, bw1) and a target black point B3 (Lb2, ab1, bb1) having brightness equal to the brightness (Lw2), (Lb2) of each of the white point W2 and black point B2 in the mapping area A4 on the output side. The area conversion section 610 then performs a first adaptive conversion of causing the white point W1 in the mapping area A2 on the input side to match the target white point W3 through a Vonkries conversion and creates a first conversion area A6. The area conversion section 610 also performs a second adaptive conversion of causing each of the white point W1 and black point B1 in the mapping area A2 on the input side to match the target white point W3 and target black point B3 through a Vonkries conversion and creates a second conversion area A7.

Each adaptive conversion applies rotation movement, translation and expansion/compression or the like through a Vonkries conversion to the mapping area A2 on the input side, thereby causes the white point W1 and black point B1 in the mapping area A2 on the input side to match the white point W3 and target black point B3 and approximates a gray area in the mapping area A2 on the input side to an area in the neighborhood of the line connecting the white point W2 and black point B2 in the mapping area A4 on the output side, that is, the gray area in the mapping area A4 on this output side. Furthermore, at this time, areas other than the gray area in the mapping area A2 on the input side also move according to the movement of this gray area and approaches the mapping area A4 on the output side. Through such processing, the chroma range of the first conversion area A6 out of the two conversion areas A6, A7 created by this area conversion section 610 is closer to the chroma range of the mapping area A2 on the input side and the chroma range is a relatively desirable conversion area. On the other hand, the brightness range of the second conversion area A7 is closer to the brightness range of the mapping area A4 on the output side out of the two conversion areas A6, A7 and the brightness range is a relatively desirable conversion area.

The intermediate area creating section 620 combines the two conversion areas A6, A7 created by the area conversion section 610 and creates the intermediate area A3 shown in part (c) of FIG. 11. Here, the intermediate area creating section 620 creates this intermediate area A3 by obtaining each color in the intermediate area A3 through the following processing.

Here, an arbitrary one color inside the conversion area where the chroma range is closer to the chroma range of the mapping area A2 on the input side out of the two conversion areas A6, A7, that is, the second conversion area A7 is taken as an example and when one color in the intermediate area A3 is obtained starting from this one color, the method of obtaining that one color will be explained. First, a chroma which is equal to the chroma of an arbitrary one color in the second conversion area A7 is determined as the chroma of the one color in the intermediate area A3. Next, brightness of the one color in the intermediate area A3 is determined and the first conversion area A6 is used to determine the brightness. This first conversion area A6 is a conversion area whose brightness range is closer to the brightness range of the mapping area A4 on the output side out of the two conversion areas A6, A7. Here, each color in the second conversion area A7 and each color in the first conversion area A6 correspond to each other through the adaptive conversion. The intermediate area creating section 620 determines the brightness which is equal to the brightness of one color in the first conversion area A6 corresponding to the one color in the second conversion area A7 used to determine the brightness of the one color in the intermediate area A3 as the brightness of the one color in the intermediate area A3. By performing such processing starting from each color in the second conversion area A7, the intermediate area A3 shown in part (c) of FIG. 11 which has the brightness range which is equal to the brightness range of the first conversion area A6 and the chroma range equal to the chroma range of the second conversion area A7 is created. The chroma range of the intermediate area A3 created in this way matches the brightness range of the mapping area A4 on the output side and the brightness range thereof is similar to that of the mapping area A2 on the input side to a certain degree.

The definition creating section 630 performs the mapping processing whereby each color in the intermediate area A3 created by the intermediate area creating section 620 is assigned to the inside of the mapping area A4 on the output side. At this time, this mapping processing in this embodiment is performed in such a way that colors in the neighborhood of white points and in the neighborhood of black points in the intermediate area A3 are positively assigned to the neighborhood of white points and neighborhood of black points in the mapping area A4 on the output side respectively. Through such mapping processing, the correlation between the intermediate area A3 and the mapping area A4 on the output side is defined, the definition creating section 630 applies this mapping processing to each color in the intermediate area A3 and thereby substantially combines the mapping between the mapping area A2 on the input side and intermediate area A3 and the mapping between the intermediate area A3 and the mapping area A4 on the output side. The mapping combined in this way conceptually corresponds to the profile combining section 44 shown in FIG. 6. The input profile 41 and output profile 42 are combined through this profile combining section 44 and a color conversion definition which expresses the color conversion relation between the color conversion area of the color scanner 10 and the color conversion area of the color printer 30 is created in a LUT format.

In a color conversion using the color conversion definition created in this way, the chroma range in the intermediate area A3 resembles the mapping area A2 on the input side to a certain degree, and therefore the chroma of the document is maintained to a certain degree. Furthermore, the brightness range of intermediate area A3 matches the brightness range of the mapping area A4 on the output side, and therefore collapse of gradation on the highlight side or the shadow side of an image expressed by image data after this color conversion or the like is suppressed. That is, according to the color conversion definition creating apparatus 600 of this embodiment, even when the brightness range of the color expression area of the output device is extremely narrower than the brightness range of the color expression area of the input device, the output device can create a color conversion definition whereby an image of natural colors can be obtained.

Next, each of second embodiments of the color conversion definition creating method of the present invention, color conversion definition creating program storage medium of the present invention and color conversion definition creating apparatus of the present invention will be explained.

Here, as explained with reference to FIG. 11, according to each of the first embodiments of the present invention, the target white point W3 and target black point B3 to which the white point W1 and black point B1 in the mapping area A2 on the input side are matched are set based on the mapping area A2 on the input side and the mapping area A4 on the output side. On the other hand, each of the second embodiments of the present invention which will be explained below differs from the first embodiment in that a white point and black point input through the operator's operation are used as the target white point W3 and target black point B3 respectively.

Furthermore, each of the first embodiments of the present invention determines a color having a chroma of color in the conversion area where the chroma range is closer to the chroma range on the input side out of the two conversion areas created through the adaptive conversion and brightness of color in the conversion area where the brightness range is closer to the brightness range on the output side corresponding to the color through the adaptive conversion as the color in the intermediate area. On the other hand, each of the second embodiments of the present invention which will be explained below differs from the first embodiment in that weights which will be described later are assigned to the two mutually corresponding colors through an adaptive conversion in the two conversion areas created through the adaptive conversion and the two weighed colors are mixed to obtain a color in the intermediate area.

Each of the second embodiments of the present invention will be explained focusing attention on these two differences from each of the first embodiments of the present invention.

Figure 12:
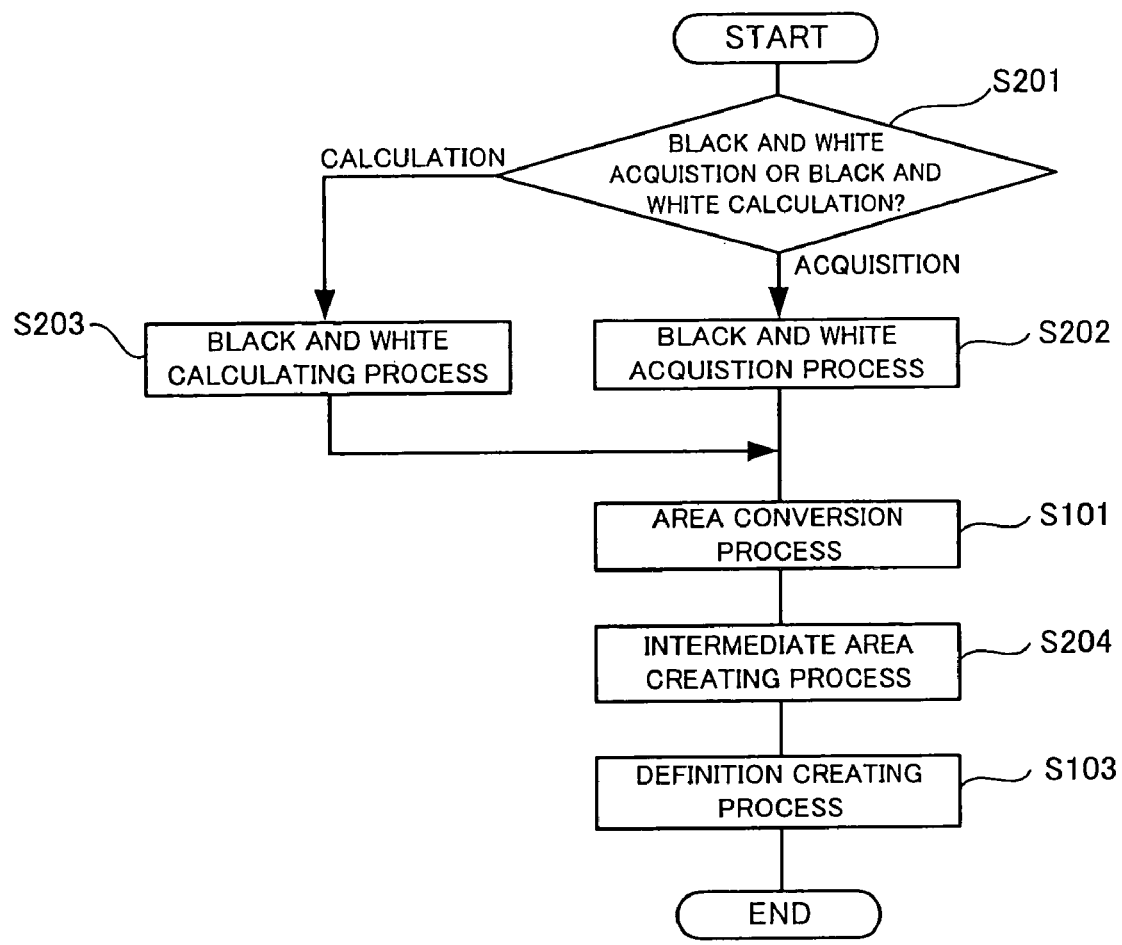
FIG. 12 is a flow chart showing a second embodiment of the color conversion definition creating method of the present invention.

FIG. 12 is a flow chart showing the second embodiment of the color conversion definition creating method of the present invention.

The color conversion definition creating method shown by this flow chart is substantially the same creating method as the first embodiment of the color conversion definition creating method of the present invention shown in the flow chart of FIG. 8, but it is different from the first embodiment in that it includes a black and white acquisition process (step S202) and a black and white calculating process (step S203) with respect to the operator's operation of inputting target white points and target black points. The color conversion definition creating method shown in the flow chart of this FIG. 12 makes it possible to select which of the black and white acquisition process (step S202) and the black and white calculating process (step S203) should be used to execute the input operation and provides a selection process (step S201) of selecting which process should be executed prior to these two processes. Any one of the black and white acquisition process (step S202) and the black and white calculating process (step S203) is executed according to the selection result in this selection process (step S201).

Furthermore, according to the color conversion definition creating method shown in the flow chart of this FIG. 12, an area conversion process equivalent to the area conversion process (step S101) shown in FIG. 8 is executed after any one of the black and white acquisition process (step S202) and the black and white calculating process (step S203) is executed. Next, an intermediate area creating process (step S204) which has a method of obtaining a color in the intermediate area different from that of the intermediate area creating process shown in FIG. 8 (step S102) is executed. Next, a color conversion definition is created through a definition creating process equivalent to the definition creating process (step S103) shown in FIG. 8 and the process ends. In FIG. 12, the area conversion process and the definition creating process are assigned the same reference numerals as those in FIG. 8 and overlapping explanations of these processes will be omitted below. Furthermore, details of the black and white acquisition process (step S202), the black and white calculating process (step S203) and the intermediate area creating process (step S204) will be explained together with the corresponding components in the second embodiment of the color conversion definition creating apparatus of the present invention.

Next, the second embodiment of the color conversion definition creating program storage medium of the present invention will be explained.

Figure 13:
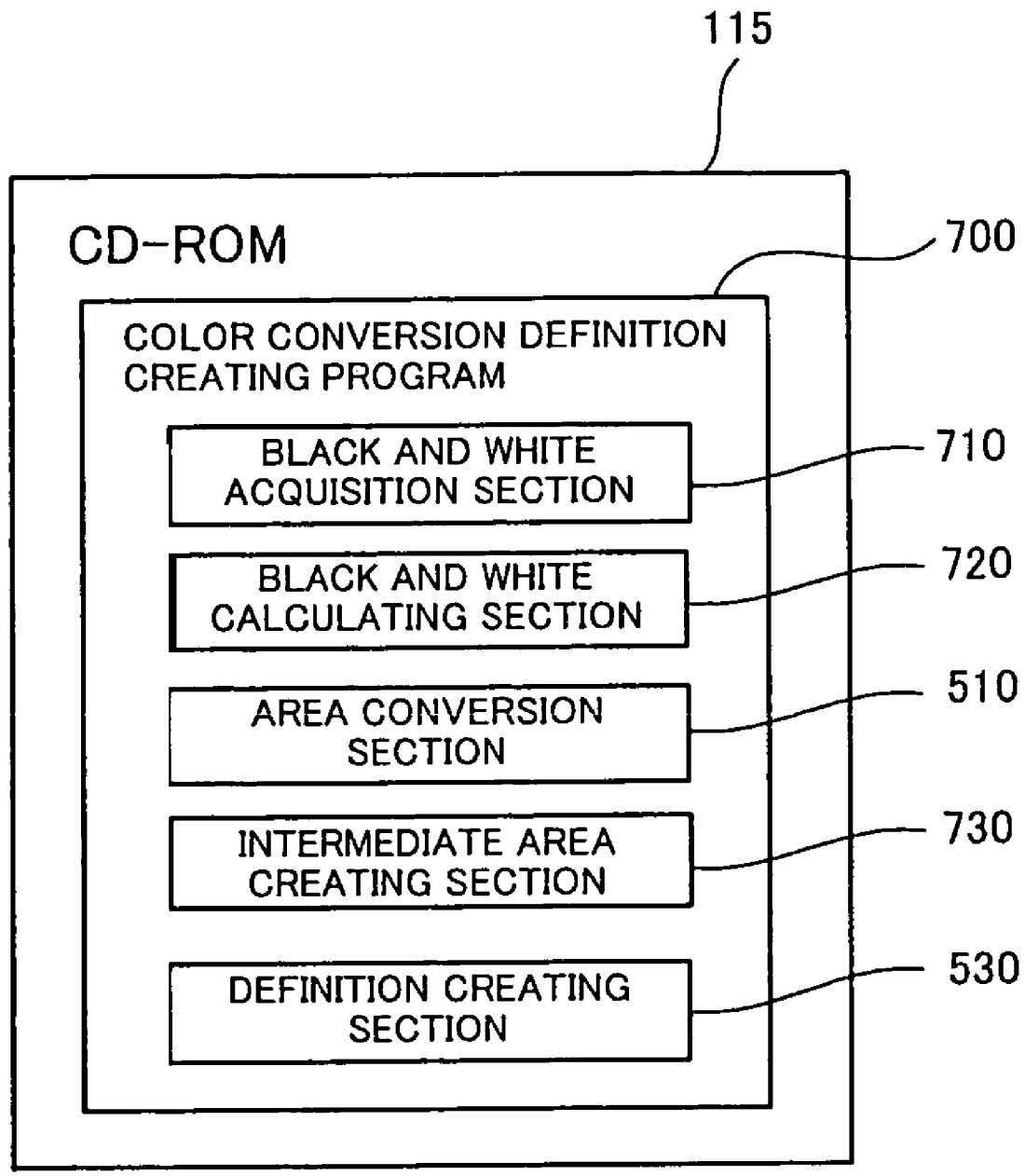
FIG. 13 is a conceptual diagram showing a second embodiment of the color conversion definition creating program storage medium of the present invention.

FIG. 13 is a conceptual diagram showing the second embodiment of the color conversion definition creating program storage medium of the present invention.

The CD-ROM 115 shown in FIG. 13 stores a color conversion definition creating program 700 and corresponds to the second embodiment of the color conversion definition creating program storage medium of the present invention.

This color conversion definition creating program 700 is intended to operate the personal computer 20 shown in FIG. 1 to FIG. 3 as the second embodiment of the color conversion definition creating apparatus of the present invention. Here, this color conversion definition creating program 700 differs from the first embodiment in that it is provided with a black and white acquisition section 710 and a black and white calculating section 720 about the operator's operation of inputting the target white point and target black point and that it is provided with an intermediate area creating section 730 which is different from the intermediate area creating section 520 shown in FIG. 9. Furthermore, this color conversion definition creating program 700 is provided with an area conversion section and a definition creating section equivalent to the area conversion section 510 and definition creating section 530 shown in FIG. 9 respectively. In FIG. 13, these components are assigned the same reference numerals as those in FIG. 9 and overlapping explanation about these components will be omitted below. Furthermore, details of the black and white acquisition section 710, black and white calculating section 720 and intermediate area creating section 730 will be explained together with the corresponding components in the second embodiment of the color conversion definition creating apparatus of the present invention.

Next, the second embodiment of the color conversion definition creating apparatus of the present invention will be explained.

Figure 14:
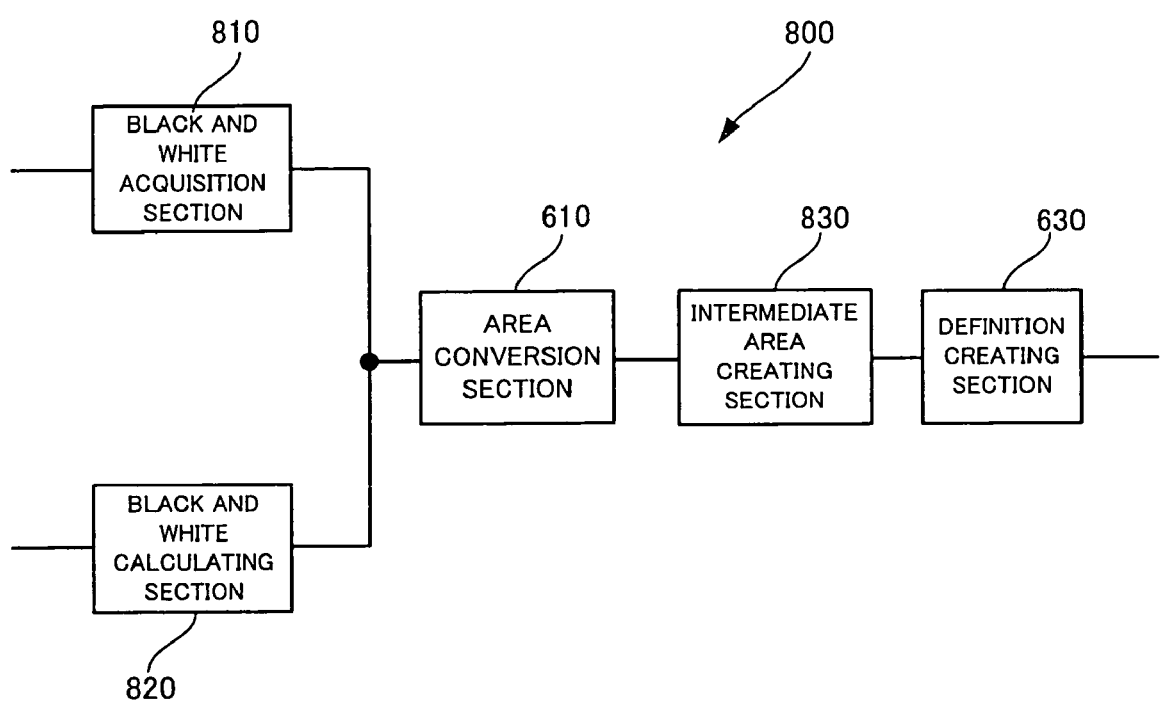
FIG. 14 is a functional block diagram showing the functions a color conversion definition creating program shown in FIG. 13 is installed in the personal computer shown in FIG. 1 to FIG. 3 and this personal computer operates as a second embodiment of the color conversion definition creating apparatus according to the present invention.

FIG. 14 is a functional block diagram showing the functions when the color conversion definition creating program shown in FIG. 13 is installed in the personal computer shown in FIG. 1 to FIG. 3 and this personal computer operates as the second embodiment of the color conversion definition creating apparatus according to the present invention.

The color conversion definition creating apparatus 800 shown in FIG. 14 is an apparatus which is substantially the same as the first embodiment of the color conversion definition creating apparatus of the present invention shown in FIG. 10, but it is different from the first embodiment in that it is provided with a black and white acquisition section 810 and a black and white calculating section 820 about the operator's operation of inputting the target white point and target black point and that it is provided with an intermediate area creating section 830 which is different from the intermediate area creating section 620 shown in FIG. 10. Furthermore, this color conversion definition creating apparatus 800 is provided with the area conversion section and the definition creating section equivalent to the area conversion section 610 and definition creating section 630 shown in FIG. 10 respectively. In FIG. 14, these components are assigned the same reference numerals as those in FIG. 10 and overlapping explanations of these components will be omitted below. Here, the black and white acquisition section 810, black and white calculating section 820 and intermediate area creating section 830 correspond to the respective examples of the black and white acquisition section, the black and white calculating section and the intermediate area creating section at the color conversion definition creating apparatus of the present invention.

When the color conversion definition creating program 700 shown in FIG. 13 is installed in the personal computer 20 shown in FIG. 1 to FIG. 3, the black and white acquisition section 720 of this color conversion definition creating apparatus 700 is composed of the black and white acquisition section 710 of the color conversion definition creating program 700, and likewise the black and white calculating section 820 is composed of the black and white calculating section 720 and the intermediate area creating section 830 is composed of the intermediate area creating section 730. Furthermore, the black and white acquisition process (step S202) of the color conversion definition creating method shown in the flow chart of FIG. 12 is executed by the black and white acquisition section 810 of this color conversion definition creating apparatus 800, and likewise the black and white calculating process (step S203) is executed by the black and white calculating section 820 and the intermediate area creating process (step S204) is executed by the intermediate area creating section 830.

In this embodiment, a white point and black point used as the target white point and target black point are input to this color conversion definition creating apparatus 800 through the operator's operation on the following operation screen first. Before explaining each component of the color conversion definition creating apparatus 800, this operation screen will be explained first.

Figure 15:
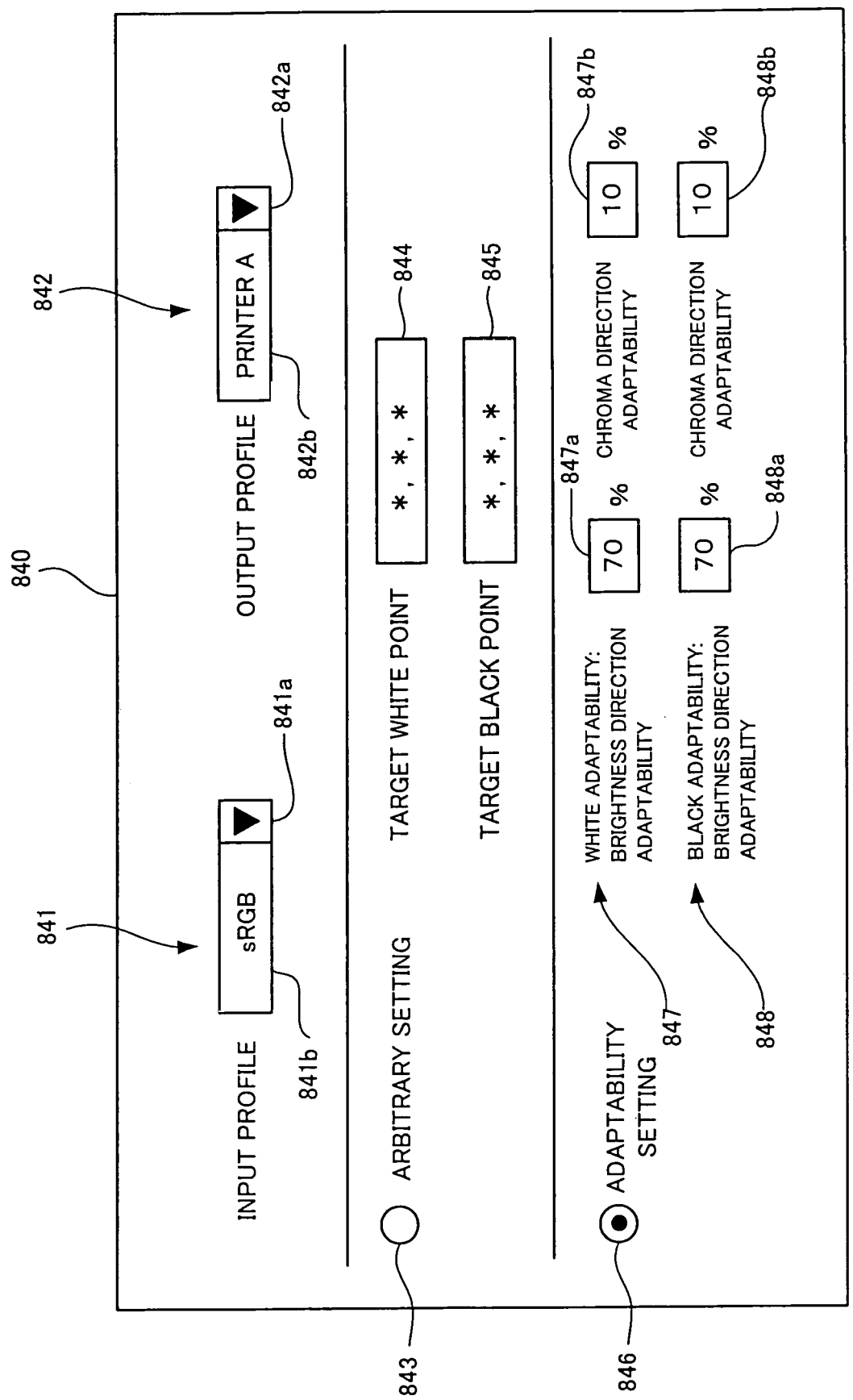
FIG. 15 shows an operation screen in which target white points and target black points are input.

FIG. 15 shows the operation screen whereby the white point and black point used as the target white point and target black point are input.

The operation screen 840 shown in this FIG. 15 is the screen whereby the white point and black point are input and the input profile and the output profile are specified, and is provided with an input profile specification section 841, an output profile specification section 842, an arbitrary setting radio button 843, a target white point input section 844, a target black point input section 845, an adaptability setting radio button 846, a white adaptability input section 847 and a black adaptability input section 848.

The input profile specification section 841 includes a pull-down button 841a and when this pull-down button 841a is operated, a pull-down menu of the input profile is displayed. When a desired input profile in the pull-down menu is specified, the specified input profile is displayed on a display section 841b as shown in FIG. 15. The output profile specification section 842 also has a pull-down button 842a, and a desired output profile is specified through the operation similar to the operation on the input profile specification section 841 and is displayed on a display section 842b.

Furthermore, in this embodiment, whether inputs of the white point and black point used as the target white point and target black point are performed by direct inputs or indirect inputs according to adaptability which will be described later is selected through the following click operation on the two radio buttons. That is, a direct input is selected when the arbitrary setting radio button 843 is clicked and an indirect input is selected when the adaptability setting radio button 846 is clicked.

When the arbitrary setting radio button 843 is clicked, an input to the target white point input section 844 and an input to the target black point input section 845 are allowed and the direct inputs of the white point and black point used as the target white point and target black point are allowed. The direct input is performed when coordinates value in the L*a*b* color space about the desired white point and black point are written into these two input sections.

When the adaptability setting radio button 846 is clicked, an input to the white adaptability input section 847 and an input to the black adaptability input section 848 are allowed, which allows indirect inputs according to the adaptability of the white point and black point used as the target white point and target black point. Here, the "adaptability" indicates to what degree each of the white point and the black point used as the target white point and target black point resembles each of the white point and the black point in the mapping area on the output side. In this embodiment, there are two types of adaptability; white adaptability which indicates the degree of similarity between the white point used as the target white point and the white point in the mapping area on the output side and black adaptability which indicates the degree of similarity between the black point used as the target black point and the black point in the mapping area on the output side, and these adaptabilities are input to the white adaptability input section 847 and black adaptability input section 848 respectively as follows. White adaptability and black adaptability are expressed by brightness direction adaptability which indicates the degree of similarity about the brightness and chroma direction adaptability which indicates the degree of similarity about the chroma. White adaptability input section 847 is provided with an input section 847a of the brightness direction adaptability and an input section 847b of the chroma direction adaptability and a desired percentage value is written into these input sections respectively as the brightness direction adaptability and chroma direction adaptability of the white adaptability. Black adaptability input section 848 is provided with an input section 848a of the brightness direction adaptability and an input section 848b of the chroma direction adaptability and a desired percentage value is written into these input sections respectively as the brightness direction adaptability and chroma direction adaptability of the black adaptability. When the white adaptability and black adaptability are input in this way, the white point and black point used as the target white point and target black point are calculated from the respective adaptabilities as described later. That is, in this embodiment, by inputting the white adaptability and black adaptability, the white point and black point used as the target white point and target black point are indirectly input.

This completes the explanation of the operation screen, and returning to FIG. 14, the components of the color conversion definition creating apparatus 800 will be explained.

The black and white acquisition section 810 operates when the arbitrary setting radio button 843 is clicked on the operation screen in FIG. 15 and the white point and black point written in the target white point input section 844 and target black point input section 845 as coordinates value respectively are acquired. In this case, the area creating section 610 uses the white point and the black point acquired by this black and white acquisition section 810 as the target white point and the target black point respectively.

The black and white calculating section 820 operates when the adaptability setting radio button 846 is clicked on the operation screen in FIG. 15 and calculates a white point and a black point according to the white adaptability and black adaptability input to the white adaptability input section 847 and black adaptability input section 848 as follows.

Suppose the coordinates of the white point in the mapping area on the input side are ($LI_w$, $aI_w$, $bI_w$), coordinates of the white point in the mapping area on the output side are ($LO_w$, $aO_w$, $bO_w$), and the white adaptability in the brightness direction and chroma direction are $W_L$ and $W_{ab}$ respectively. Then, coordinates ($L_w$, $a_w$, $b_w$) of the white point according to the white adaptability are calculated by the following expression.

$$L_w = LI_w \times (1-W_L) + LO_w \times W_L \tag{1}$$

$$a_w = aI_w \times (1-W_{ab}) + aO_w \times W_{ab} \tag{2}$$

$$b_w = bI_w \times (1-W_{ab}) + bO_w \times W_{ab} \tag{3}$$

In the same way, suppose the coordinates of the black point in the mapping area on the input side are ($LI_b$, $aI_b$, $bI_b$), coordinates of the black point in the mapping area on the output side are ($LO_b$, $aO_b$, $bO_b$), and the black adaptability in the brightness direction and chroma direction are $B_L$ and $B_{ab}$. Then, coordinates ($L_b$, $a_b$, $b_b$) of the black point according to the black adaptability are calculated by the following expression.

$$L_b = LI_b \times (1-B_L) + LO_b \times B_L \tag{4}$$

$$a_b = aI_b \times (1-B_{ab}) + aO_b \times B_{ab} \tag{5}$$

$$b_b = bI_b \times (1-B_{ab}) + bO_b \times B_{ab} \tag{6}$$

The black and white calculating section 820 hands over the white point and black point calculated according to these expressions to the area creating section 610. In this case, the area creating section 610 uses the white point and black point calculated at this black and white calculating section 820 as the target white point and target black point respectively.

As explained above, this embodiment uses the white point and black point input using any one of the direct input at the black and white acquisition section 810 and indirect input at the black and white calculating section 820 as the target white point and target black point respectively. The area creating section 610 performs two types of adaptive conversions similar to those of the first embodiment and creates two conversion areas. Furthermore, the intermediate area creating section 830 uses those two conversion areas and creates an intermediate area to combine the input profile and output profile.

Figure 16:
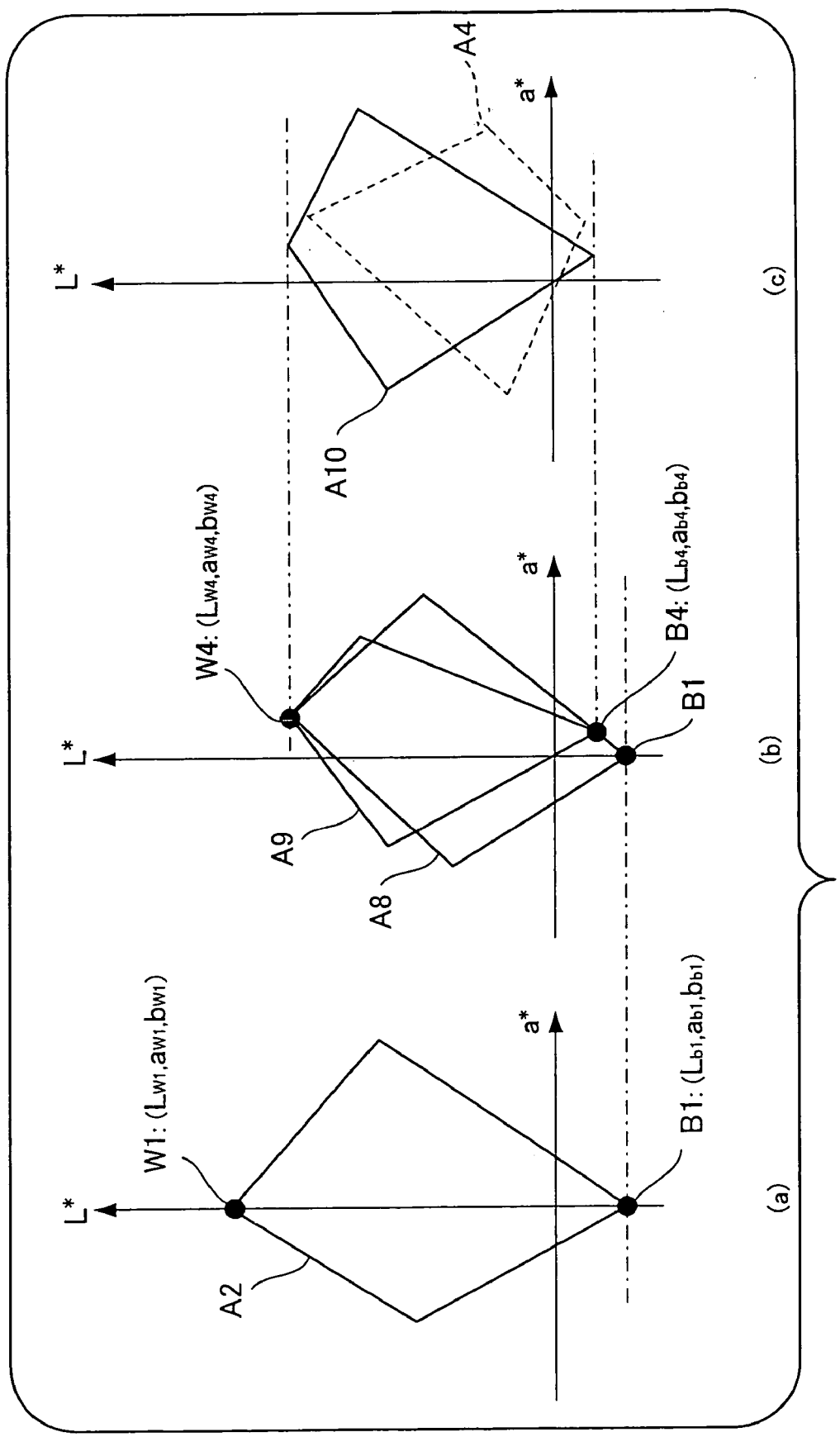
FIG. 16 is a conceptual diagram showing how an adaptive conversion and intermediate area creating processing are executed by the color conversion definition creating apparatus shown in FIG. 14.

Here, FIG. 16 is a conceptual diagram showing the state of an adaptive conversion and intermediate area creating processing executed by the color conversion definition creating apparatus 800 shown in FIG. 14 and this FIG. 16 will be referred to as required in explanations of the rest of the color conversion definition creating apparatus 600 in FIG. 14 below.

As in the case of the first embodiment, the area conversion section 610 of this embodiment acquires a mapping area A2 on the input side shown in part (a) of FIG. 16 and a mapping area A4 on the output side shown in part (c) of FIG. 16 first. Furthermore, this FIG. 16 also shows an L*–a* plane about an L*a*b* color space to simplify illustration as in the case of FIG. 11.

Next, as in the case of the first embodiment, this area conversion section 610 performs a first adaptive conversion of causing the white point W1 in the mapping area A2 on the input side to match the target white point W4 shown in part (b) of FIG. 16 and creates a first conversion area A8. Furthermore, the area conversion section 610 performs a second adaptive conversion of causing the white point W1 and black point B2 in the mapping area A2 on the input side to match the target white point W4 and target black point B4 shown in part (b) of FIG. 11 and creates a second conversion area A9. However, the target white point W4 here is the white point obtained at the black and white acquisition section 810 or black and white calculating section 820, and in the same way, the target black point B4 is the black point obtained at the black and white acquisition section 810 or black and white calculating section 820. Out of the two conversion areas A8, A9 created at the area conversion section 610 of this embodiment, the chroma range of the first conversion area A8 is closer to the chroma range of the mapping area A2 on the input side out of the two conversion areas A8, A9 and is a conversion area having a relatively preferable chroma range. On the other hand, the brightness range of the second conversion area A9 is closer to the brightness range of the mapping area A4 on the output side out of the two conversion areas A8, A9 and is a conversion area having a relatively preferable brightness range.

The intermediate area creating section 830 combines the two conversion areas A8, A9 created by the area conversion section 610 and creates an intermediate area A10 shown in part (c) of FIG. 16. Unlike the first embodiment, this intermediate area creating section 830 creates this intermediate area A10 by calculating each color in the intermediate area A10 according to the following expression.

Suppose coordinates of an arbitrary color in the mapping area A2 on the input side is (LI, aI, bI), a coefficient of the color according to the distance from the gray axis is r, coordinates of a color in the first conversion area A8 which corresponds to the color through the first conversion are ($L_1$, $a_1$, $b_1$) and coordinates of a color in the second conversion area A9 which corresponds to the color through the second adaptive conversion are ($L_2$, $a_2$, $b_2$). Then, the coordinates (L, a, b) of a color in the intermediate area A10 which corresponds to the color are calculated by the following expressions.

$$L = L_2 \times (1-r) + L_1 \times r \tag{7}$$

$$a = a_2 \times (1-r) + a_1 \times r \tag{8}$$

$$b = b_2 \times (1-r) + b_1 \times r \tag{9}$$

Here, this embodiment presupposes that the straight line showing a color matching gray (R=G=B) in the RGB color space on the input side which is dependent on the color scanner 10 matches the gray axis in the L*a*b* color space, that is, the L* axis. That is, the distance from the gray axis corresponds to the distance from the straight line showing the color matching gray (R=G=B) in the RGB color space on the input side. As the coefficient r according to this distance, this embodiment adopts a normalized difference between a maximum value and a minimum value of three coordinate values R, G, B when the coordinates of the color in the color expression area A1 (see part (a) in FIG. 7) of the color scanner 10 in the RGB color space which is the source of the mapping area A2 on the input side corresponding to the arbitrary color are assumed to be (R, G, B). This coefficient r takes a value of "0 to 1" and corresponds to an example of "weight" according to the present invention.

This intermediate area creating section 830 performs calculations using Expression (7), Expression (8) and Expression (9) on two or more coordinates in the mapping area A2 on the input side and thereby creates the intermediate area A10. The intermediate area A10 created in this way has a brightness range close to the brightness range of the mapping area A4 on the output side to a certain degree and has a chroma range close to that of the mapping area A2 on the input side to a certain degree.

As in the case of the first embodiment, the definition creating section 630 of this embodiment performs the mapping processing of assigning colors in the intermediate area A10 created at the intermediate area creating section 830 to the inside of the mapping area A4 on the output side. Furthermore, as in the case of the first embodiment, this embodiment performs this mapping processing on colors in the neighborhood of white points and in the neighborhood of black points in the intermediate area A10 in such a way that the colors are positively assigned to the neighborhood of white points and the neighborhood of black points in the mapping area A4 on the output side respectively. Through such mapping processing, a color conversion definition indicating a color conversion relationship between the color conversion area of the color scanner 10 and the color conversion area of the color printer 30 is created in a LUT format.

As in the case of the first embodiment, the second embodiment of the color conversion definition creating apparatus of the explained present invention or each of the second embodiments of the color conversion definition creating method of the present invention, and the color conversion definition creating program storage medium of the present invention can create a color conversion definition capable of obtaining an image of natural colors using an output device even when the brightness range of the color expression area of the output device is extremely narrower than the brightness range of the color expression area of the input device.

The foregoing descriptions have illustrated the color conversion definition creating apparatus 600 of the first embodiment which executes the processing of performing an adaptive conversion using a target white point and target black point automatically obtained in the apparatus, simply combining chroma and brightness of colors of two conversion areas obtained through the adaptive conversion and creating a color in the intermediate area, and the color conversion definition creating apparatus 800 of the second embodiment which executes the processing of performing an adaptive conversion using a white point and black point obtained through the operator's operation, creating a color in the intermediate area by mixing the colors of two conversion areas obtained through the adaptive conversion with appropriate weights assigned thereto, but the present invention is not limited to them. The color conversion definition creating apparatus of the present invention may also execute an adaptive conversion like the first embodiment and creation processing about the color in the intermediate area like the second embodiment or adaptive conversion similar to that in the second embodiment and creation processing about the color in the intermediate area like the first embodiment.

Furthermore, the foregoing descriptions have illustrated the color conversion definition creating apparatuses 600, 800 which use the L*a*b* color space as a common color space which is independent of the device and combines an input profile and an output profile in this L*a*b* color space, but the present invention is not limited to these apparatuses. The color conversion definition creating apparatus of the present invention may also use, for example, a Luv color space and XYZ color space or the like as the common color space which is independent of the device.

Furthermore, the foregoing descriptions have illustrated the color conversion definition creating apparatus 600 of the first embodiment which simply obtains a target white point and target black point from their white point and black point of the two mapping areas and the color conversion definition creating apparatus 800 of the second embodiment which uses the white point and black point obtained through the operator's operation as the target white point and target black point, but the present invention is not limited to these apparatuses. The color conversion definition creating apparatus of the present invention may also be such an apparatus that determines the chroma of each of the white point and black point used as the target white point and target black point according to the chroma of the white point in the mapping area on the output side by, for example, slightly deviating the chroma of each of the white point and black point used as the target white point and target black point toward the direction of the blue color when the white point in the mapping area on the output side takes on a yellowish tinge (for example, when a recording sheet to which the color printer outputs an image takes on a yellowish tinge). In this case, it is also possible to determine the brightness of each of the white point and black point used as the target white point and target black point according to the brightness of each of the white point and the black point in the mapping area on the output side.

What is claimed is:

1. A color conversion definition creating apparatus that creates a color conversion definition which defines a color conversion relationship between a first color expression area expressing a range of colors that can be expressed by a first device that mediates between an image and image data and a second color expression area expressing a range of colors that can be expressed by a second device that mediates between an image and image data, comprising:

an area conversion means for creating a plurality of conversion areas by executing an adaptive conversion of approximating a gray area in the first color expression area to a gray area in the second color expression area while causing areas other than the gray area to move following the gray area for each of a plurality of types of adaptive conversions having different ways of approximation;

an intermediate area creating means for creating an intermediate area by combining a first conversion area excluding a conversion area which has a chroma range most different from the chroma range of the first color expression area out of the plurality of conversion areas created by the area conversion means and a second conversion area excluding a conversion area having a brightness range most different from the brightness range of the second color expression area out of the plurality of conversion areas created by the area conversion means;

a definition creating means for creating the color conversion definition by combining a correlation between colors in the first color expression area and colors in the intermediate area, and a correlation between colors in the intermediate area and colors in the second color expression area, wherein using a target white point whose closeness to a white point in the second color expression area is greater than closeness of a white point in the first color expression area to the white point in the second color expression area and a target black point whose closeness to a black point in the second color expression area is greater than closeness of a black point in the first color expression area to the black point in the second color expression area, the area conversion means executes a first adaptive conversion of causing the white point in the first color expression area to match the target white point and a second adaptive conversion of causing the white point and black point in the first color expression area to match the target white point and target black point to thereby create two conversion areas; and a black and white calculating means for receiving degrees of similarity of the target white point and the target black point to a white point and black point in the second color expression area according to an operation and calculates a white point and black point according to the degrees of similarity, wherein the area conversion means uses the white point and the black point calculated by the black and white calculating section as the target white point and target black point.

2. The color conversion definition creating apparatus according to claim 1, wherein when creating the intermediate area by combining the first conversion area and the second conversion area, the intermediate area creating means mixes a color in the first conversion area and a color in the second conversion area corresponding to the color in the first conversion area through the plurality of types of adaptive conversions with heavier weights assigned to colors at greater distances from the gray area and determines the mixed color obtained by the mixture as the color in the intermediate area.

3. A computer-readable medium having embodied thereon a color conversion definition creating program, which when executed by a computer, the program causes the computer to operate as a color conversion definition creating apparatus that creates a color conversion definition which defines a color conversion relationship between a first color expression area expressing a range of colors that can be expressed by a first device that mediates between an image and image data and a second color expression area expressing a range of colors that can be expressed by a second device that mediates between an image and image data, the color conversion definition creating apparatus comprising:

an area conversion means for creating a plurality of conversion areas by executing an adaptive conversion of approximating a gray area in the first color expression area to a gray area in the second color expression area while causing areas other than the gray area to move following the gray area for each of a plurality of types of adaptive conversions having different ways of approximation;

an intermediate area creating means for creating an intermediate area by combining a first conversion area excluding a conversion area which has a chroma range most different from the chroma range of the first color expression area out of the plurality of conversion areas created by the area conversion means and a second conversion area excluding a conversion area having a brightness range most different from the brightness range of the second color expression area out of the plurality of conversion areas created by the area conversion means;

a definition creating means for creating the color conversion definition by combining a correlation between colors in the first color expression area and colors in the intermediate area, and a correlation between colors in the intermediate area and colors in the second color expression area, wherein using a target white point whose closeness to a white point in the second color expression area is greater than closeness of a white point in the first color expression area to the white point in the second color expression area and a target black point whose closeness to a black point in the second color expression area is greater than closeness of a black point in the first color expression area to the black point in the second color expression area, the area conversion means executes a first adaptive conversion of causing the white point in the first color expression area to match the target white point and a second adaptive conversion of causing the white point and black point in the first color expression area to match the target white point and target black point to thereby create two conversion areas; and a black and white calculating means for receiving degrees of similarity of the target white point and the target black point to a white point and black point in the second color expression area according to an operation and calculates a white point and black point according to the degrees of similarity, wherein the area conversion means uses the white point and the black point calculated by the black and white calculating section as the target white point and target black point.

4. A color conversion definition creating method for creating a color conversion definition which defines a color conversion relationship between a first color expression area expressing a range of colors that can be expressed by a first device that mediates between an image and image data and a second color expression area expressing a range of colors that can be expressed by a second device that mediates between an image and image data, comprising:

an area conversion step of creating a plurality of conversion areas by executing an adaptive conversion of approximating a gray area in the first color expression area to a gray area in the second color expression area while causing areas other than the gray area to move following the gray area for each of a plurality of types of adaptive conversions having different ways of approximation;

an intermediate area creating step of creating an intermediate area by combining a first conversion area excluding a conversion area which has a chroma range most different from the chroma range of the first color expression area out of the plurality of conversion areas created by the area conversion step and a second conversion area excluding a conversion area having a brightness range most different from the brightness range of the second color expression area;

a definition creating step of creating the color conversion definition by combining a correlation between colors in the first color expression area and colors in the intermediate area, and a correlation between colors in the intermediate area and colors in the second color expression area, wherein using a target white point whose closeness to a white point in the second color expression area is greater than closeness of a white point in the first color expression area to the white point in the second color expression area and a target black point whose closeness to a black point in the second color expression area is greater than closeness of a black point in the first color expression area to the black point in the second color expression area, the area conversion step executes a first adaptive conversion of causing the white point in the first color expression area to match the target white point and a second adaptive conversion of causing the white point and black point in the first color expression area to match the target white point and target black point to thereby create two conversion areas; and a black and white calculating step of receiving degrees of similarity of the target white point and the target black point to a white point and black point in the second color expression area according to an operation and calculating a white point and black point according to the degrees of similarity, wherein the area conversion step uses the white point and the black point calculated by the black and white calculating step as the target white point and target black point.

5. The computer-readable medium according to claim 3, wherein an area of the second color expression area is narrower than an area of the first color expression area.

6. The computer-readable medium according to claim 3, wherein each color in one of the plurality of conversion areas corresponds to a color in each other of the plurality of conversion areas through the adaptive conversion.

7. The computer-readable medium according to claim 3, wherein the plurality of conversion areas include:
- a first color conversion area that is a color expression area of an input device mapped onto a device-independent color space from an input profile that is dependent on the input device; and
- a second color conversion area that is a color expression area of an output device mapped onto a device-independent color space from an output profile that is dependent on the output device.

8. The method according to claim 4, further comprising:
storing the created color conversion definition in a lookup table format in a tangible computer-readable storage medium.

9. The method according to claim 8, further comprising:
converting an image received by the first device using the stored color conversion definition and outputting the converted image at the second device.

10. The method according to claim 9, wherein the method is performed by a computer.

11. The method according to claim 4, wherein the second conversion area comprises a second conversion area excluding a conversion area having a brightness range most different from the brightness range of the second color expression area out of the plurality of conversion areas created by the area conversion step.

* * * * *